United States Patent
Hosokawa et al.

(10) Patent No.: US 10,247,955 B2
(45) Date of Patent: Apr. 2, 2019

(54) LENS DRIVE DEVICE

(71) Applicant: TDK CORPORATION, Tokyo (JP)

(72) Inventors: Masahiro Hosokawa, Tokyo (JP); Takuto Horii, Tokyo (JP); Naoki Yusa, Tokyo (JP)

(73) Assignee: TDK CORPORATION, Tokyo (JP)

(*) Notice: Subject to any disclaimer, the term of this patent is extended or adjusted under 35 U.S.C. 154(b) by 56 days.

(21) Appl. No.: 15/658,702

(22) Filed: Jul. 25, 2017

(65) Prior Publication Data

US 2018/0031853 A1 Feb. 1, 2018

(30) Foreign Application Priority Data

Jul. 29, 2016 (JP) .................... 2016-150218

(51) Int. Cl.
| | |
|---|---|
| *G02B 27/64* | (2006.01) |
| *G03B 5/04* | (2006.01) |
| *G03B 13/36* | (2006.01) |
| *G02B 7/09* | (2006.01) |
| *G02B 7/10* | (2006.01) |

(52) U.S. Cl.
CPC ............. *G02B 27/646* (2013.01); *G02B 7/09* (2013.01); *G03B 5/04* (2013.01); *G03B 13/36* (2013.01); *G02B 7/102* (2013.01); *G03B 2205/0015* (2013.01); *G03B 2205/0061* (2013.01)

(58) Field of Classification Search
None
See application file for complete search history.

(56) References Cited

U.S. PATENT DOCUMENTS

| | | | | |
|---|---|---|---|---|
| 2005/0276588 | A1* | 12/2005 | Tsutsumi | G02B 27/646 396/55 |
| 2009/0040633 | A1 | 2/2009 | Chikami | |
| 2015/0229843 | A1* | 8/2015 | Shimizu | G03B 5/00 348/222.1 |
| 2018/0031853 | A1* | 2/2018 | Hosokawa | G02B 27/646 |
| 2018/0031855 | A1* | 2/2018 | Hosokawa | H02N 2/025 |
| 2018/0031856 | A1* | 2/2018 | Hosokawa | G02B 27/646 |
| 2018/0031857 | A1* | 2/2018 | Hosokawa | G02B 7/09 |
| 2018/0113276 | A1* | 4/2018 | Hosokawa | G02B 7/026 |
| 2018/0113323 | A1* | 4/2018 | Hosokawa | G02B 27/646 |

FOREIGN PATENT DOCUMENTS

JP 2009-42551 A 2/2009

* cited by examiner

*Primary Examiner* — William B Perkey
(74) *Attorney, Agent, or Firm* — Oliff PLC

(57) ABSTRACT

An X-axis movable object holding portion to hold an X-axis movable object to be movable in an X-axis direction is provided at a position facing an X-axis actuator with an optical axis between the X-axis movable object holding portion and the X-axis actuator in a base member. A Y-axis movable object holding portion to hold a Y-axis movable object to be movable in a Y-axis direction is provided at a position facing a Y-axis actuator with the optical axis between the Y-axis movable object holding portion and the Y-axis actuator in the X-axis movable object. An auxiliary member supports a carrier actuator to move a lens carrier. In the lens carrier, a movement of the direction of the optical axis is regulated by a carrier stopper mechanism.

5 Claims, 22 Drawing Sheets

LENS DRIVE DEVICE

CROSS-REFERENCE TO RELATED APPLICATIONS

The disclosure is based upon and claims the benefit of priority from Japanese Patent Application No. 2016-150218, filed on Jul. 29, 2016, the entire contents of which are incorporated herein by reference.

TECHNICAL FIELD

The present disclosure relates to a lens drive device.

BACKGROUND

Conventionally, a lens drive device adopting a smooth impact drive mechanism is known as a kind of a lens drive device used in an imaging apparatus mounted on a mobile phone or the like.

The lens drive device adopting the smooth impact drive mechanism is disclosed in Japanese Unexamined Patent Publication No. 2009-42551, for example. The lens drive device disclosed in Japanese Unexamined Patent Publication No. 2009-42551 moves a lens unit in two directions orthogonal to a direction of an optical axis by two actuators using the smooth impact drive mechanism and realizes a shake correction function. In addition, the lens drive device moves the lens unit in the direction of the optical axis by the actuators using the smooth impact drive mechanism and realizes a zoom function (autofocus function).

SUMMARY

In a field of the lens drive device, it is required that the movable objects are stably moved at the time of drive by the actuators.

Accordingly, the present disclosure discloses a lens drive device capable of moving movable objects stably.

According to one aspect of the present disclosure, there is provided a lens drive device for driving a lens. The lens drive device includes a base member; an X-axis actuator configured to be provided in the base member and have an X-axis piezoelectric element expanding and contracting in an X-axis direction orthogonal to a direction of an optical axis of the lens and an X-axis drive shaft fixed on one end portion of the X-axis direction in the X-axis piezoelectric element; an X-axis movable object configured to be disposed to overlap the base member in the direction of the optical axis of the lens and have an X-axis friction engagement portion frictionally engaging with outer circumference of the X-axis drive shaft; an X-axis movable object holding portion configured to be provided at a position facing the X-axis actuator with the optical axis of the lens between the X-axis movable object holding portion and the X-axis actuator in the base member and hold the X-axis movable object to be movable in the X-axis direction with respect to the base member; a Y-axis actuator configured to be provided in the X-axis movable object and have a Y-axis piezoelectric element expanding and contracting in a Y-axis direction orthogonal to the direction of the optical axis of the lens and crossing the X-axis direction and a Y-axis drive shaft fixed on one end portion of the Y-axis direction in the Y-axis piezoelectric element; a Y-axis movable object configured to be disposed to overlap the X-axis movable object at the side opposite to the side provided with the base member in the direction of the optical axis of the lens and have a Y-axis friction engagement portion frictionally engaging with outer circumference of the Y-axis drive shaft; a Y-axis movable object holding portion configured to be provided at a position facing the Y-axis actuator with the optical axis of the lens between the Y-axis movable object holding portion and the Y-axis actuator in the X-axis movable object and hold the Y-axis movable object to be movable in the Y-axis direction with respect to the X-axis movable object; a carrier actuator configured to be provided in the Y-axis movable object and have a Z-axis piezoelectric element expanding and contracting in the direction of the optical axis of the lens and a Z-axis drive shaft fixed on one end portion of the direction of the optical axis in the Z-axis piezoelectric element; a lens carrier configured to be disposed to overlap the Y-axis movable object at the side opposite to the side provided with the X-axis movable object in the direction of the optical axis of the lens and have a Z-axis friction engagement portion frictionally engaging with outer circumference of the Z-axis drive shaft and a lens attachment portion to attach the lens; an auxiliary member configured to be attached to the Y-axis movable object and support the carrier actuator; and a carrier stopper mechanism configured to restrict a movement of the lens carrier in the direction of the optical axis of the lens.

In the lens drive device, the X-axis movable object holding portion holds the X-axis movable object to be movable in the X-axis direction. As a result, when the X-axis movable object is moved by the X-axis actuator, the X-axis movable object can be stably moved in the X-axis direction by suppressing looseness. In addition, the X-axis movable object holding portion is provided at the position facing the X-axis actuator with the optical axis L between the X-axis movable object holding portion and the X-axis actuator in the base member, so that the X-axis movable object holding portion can hold the X-axis movable object with the gravity center of the lens between the X-axis movable object holding portion and the X-axis actuator. As a result, the lens drive device can move the X-axis movable object in the X-axis direction more stably by the X-axis actuator and the X-axis movable object holding portion.

Likewise, for the Y-axis movable object, the lens drive device includes the Y-axis movable object holding portion. Therefore, when the Y-axis movable object is moved, the Y-axis movable object can be stably moved in the Y-axis direction by suppressing the looseness. In addition, the Y-axis movable object holding portion is provided at the position facing the Y-axis actuator with the optical axis between the Y-axis movable object holding portion and the Y-axis actuator in the X-axis movable object, so that the Y-axis movable object holding portion can hold the Y-axis movable object with the gravity center of the lens between the Y-axis movable object holding portion and the Y-axis actuator. As a result, the lens drive device can move the Y-axis movable object in the Y-axis direction more stably by the Y-axis actuator and the Y-axis movable object holding portion.

Because the carrier actuator is supported by the auxiliary member attached to the Y-axis movable object, the inclination of the carrier actuator can be suppressed. As a result, when the lens carrier is moved, the lens drive device can stably move the lens carrier in the direction of the optical axis. Because the movement of the lens carrier is restricted by the carrier stopper mechanism, the lens carrier can be prevented from moving to an unintended position and the lens carrier can be prevented from coming into contact with other member unintentionally and being inclined.

As described above, the lens drive device can stably move the X-axis movable object moving in the X-axis direction, the Y-axis movable object moving in the Y-axis direction, and the lens carrier moving in the direction of the optical axis of the lens.

The auxiliary member may come in contact with an outer circumferential surface of the Z-axis drive shaft at two points or more and may support the carrier actuator. In this case, the auxiliary member can stably support the Z-axis drive shaft.

The carrier stopper mechanism may be configured using a carrier side contact portion provided in the lens carrier and coming into contact with the auxiliary member when the lens carrier moves to a position separated by a predetermined distance in the direction of the optical axis of the lens with respect to the Y-axis movable object and an auxiliary member side contact portion provided in the auxiliary member and coming into contact with the carrier side contact portion when the lens carrier moves to the position separated by the predetermined distance in the direction of the optical axis of the lens with respect to the Y-axis movable object. In this case, the lens drive device can easily realize the carrier stopper mechanism for restricting the movement of the lens carrier, by causing the carrier side contact portion of the lens carrier to come into contact with the auxiliary member side contact portion of the auxiliary member.

The lens carrier may further have a carrier body portion provided with the Z-axis friction engagement portion and the lens attachment portion and a carrier convex portion provided on an outer circumferential surface of the carrier body portion and protruding in a direction orthogonal to the direction of the optical axis of the lens. The carrier side contact portion may be configured using a surface of the carrier convex portion at the side opposite to the side of the Y-axis movable object. The auxiliary member side contact portion may be configured using a surface of the auxiliary member at the side of the Y-axis movable object. In this case, the lens drive device can restrict the movement of the lens carrier, by causing the carrier convex portion of the lens carrier to come into contact with the auxiliary member. In addition, the carrier convex portion protrudes in the direction orthogonal to the direction of the optical axis of the lens, from the outer circumferential surface of the carrier body portion. As a result, the lens drive device can realize the carrier stopper mechanism while suppressing the thickness of the direction of the optical axis of the lens from increasing.

The auxiliary member may have an approximately rectangular frame shape surrounding the lens carrier, when viewed from the direction of the optical axis of the lens. The carrier actuator may be disposed in a corner portion of the auxiliary member in a frame of the auxiliary member. The carrier stopper mechanism may be provided in the corner portion in which the carrier actuator is disposed, among corner portions of the auxiliary member. In this case, even though the drive force is input from the carrier actuator to the Z-axis friction engagement portion after the movement of the lens carrier is restricted by the carrier stopper mechanism, the drive force input from the carrier actuator is received by the carrier stopper mechanism provided in the same corner portion as the carrier actuator. As a result, even though the drive force is input from the carrier actuator to the Z-axis friction engagement portion after the movement of the lens carrier is restricted by the carrier stopper mechanism, the inclination of the lens carrier can be suppressed and the lens carrier can be maintained in a stable state.

According to one aspect of the present disclosure, movable objects can be stably moved.

DETAILED DESCRIPTION

Figure 1:
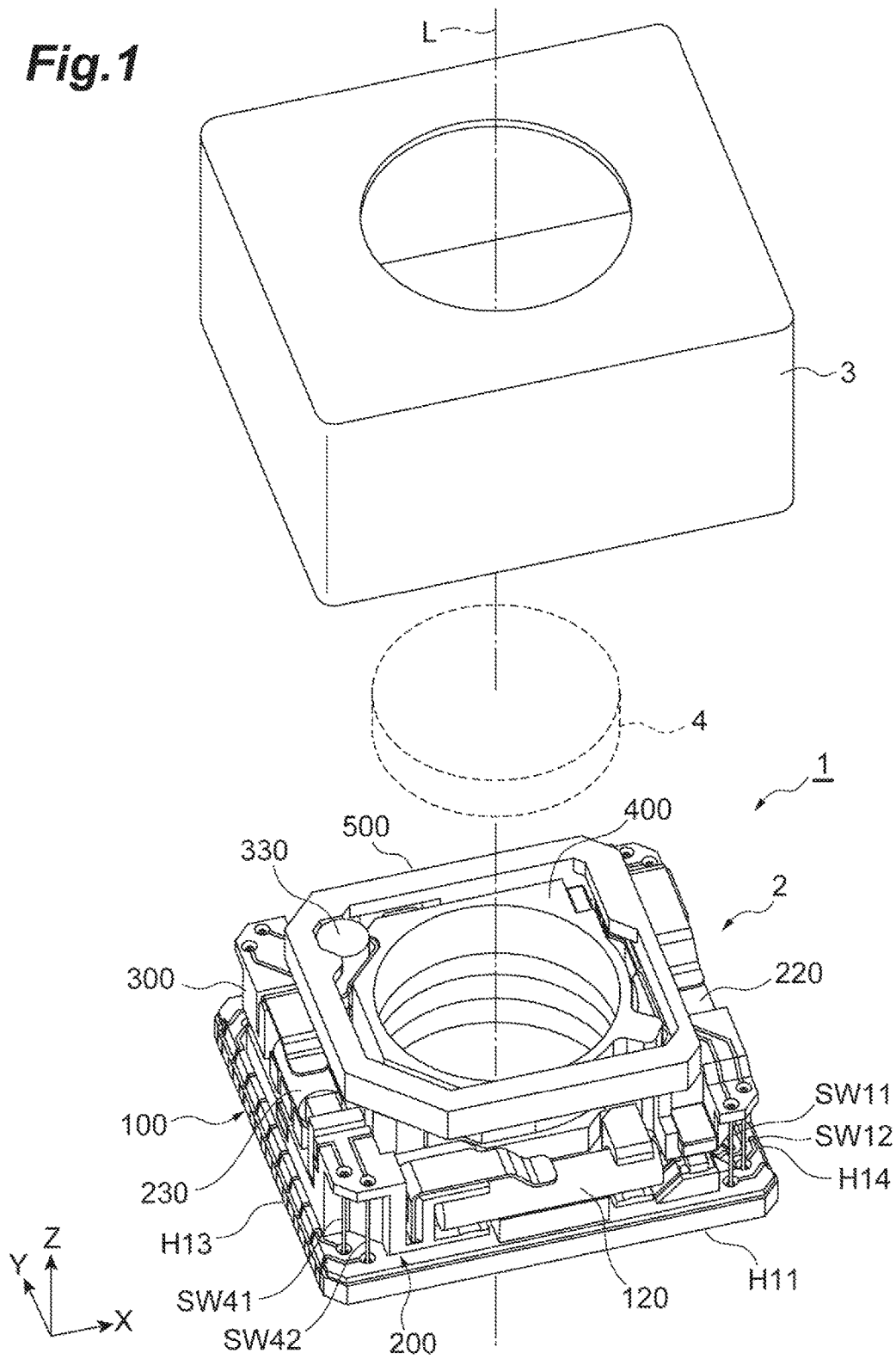
FIG. 1 is an exploded perspective view illustrating a schematic configuration of a lens drive device according to an embodiment.

Hereinafter, an embodiment of the present disclosure will be described with reference to the drawings. In the description of the drawings, the same elements are denoted with the same reference numerals and repeated explanation is omitted.

Figure 2:
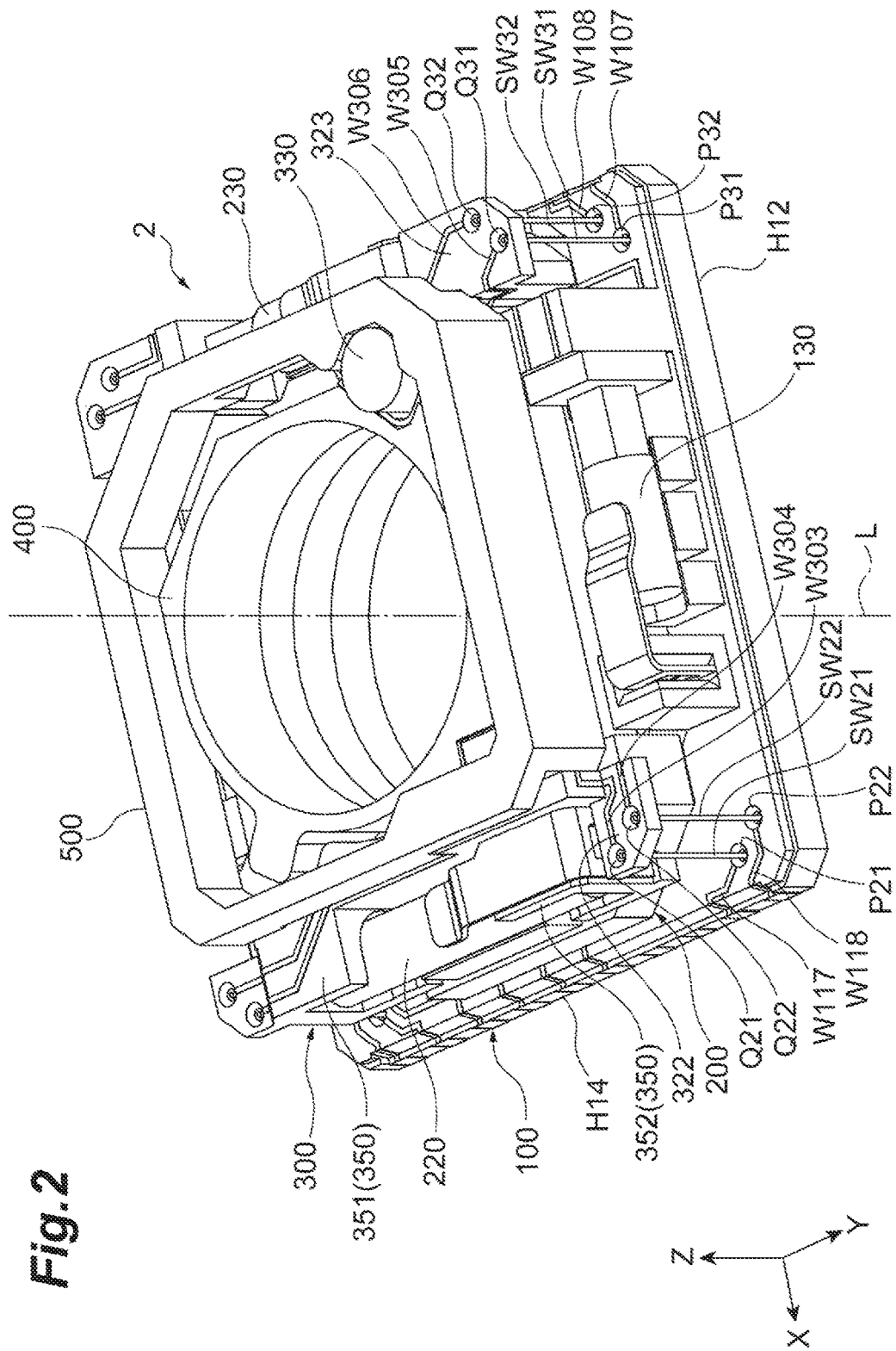
FIG. 2 is a perspective view when a lens drive unit of FIG. 1 is viewed from the side of an X-axis actuator.

A lens drive device 1 illustrated in FIGS. 1 and 2 is mounted on an imaging apparatus such as a digital camera, for example, and drives a lens 4. The lens drive device 1 includes a lens drive unit 2 and a cover 3. The lens drive device 1 has an optical axis L of the lens 4 to be attached to the lens drive unit 2.

In the individual drawings, an XYZ orthogonal coordinate system is illustrated for the convenience of description. A Z-axis direction becomes a direction of the optical axis L of the lens 4 to be attached. An X-axis direction is orthogonal to the direction of the optical axis L. A Y-axis direction is orthogonal to the direction of the optical axis L and is orthogonal to the X-axis direction.

Figure 3:
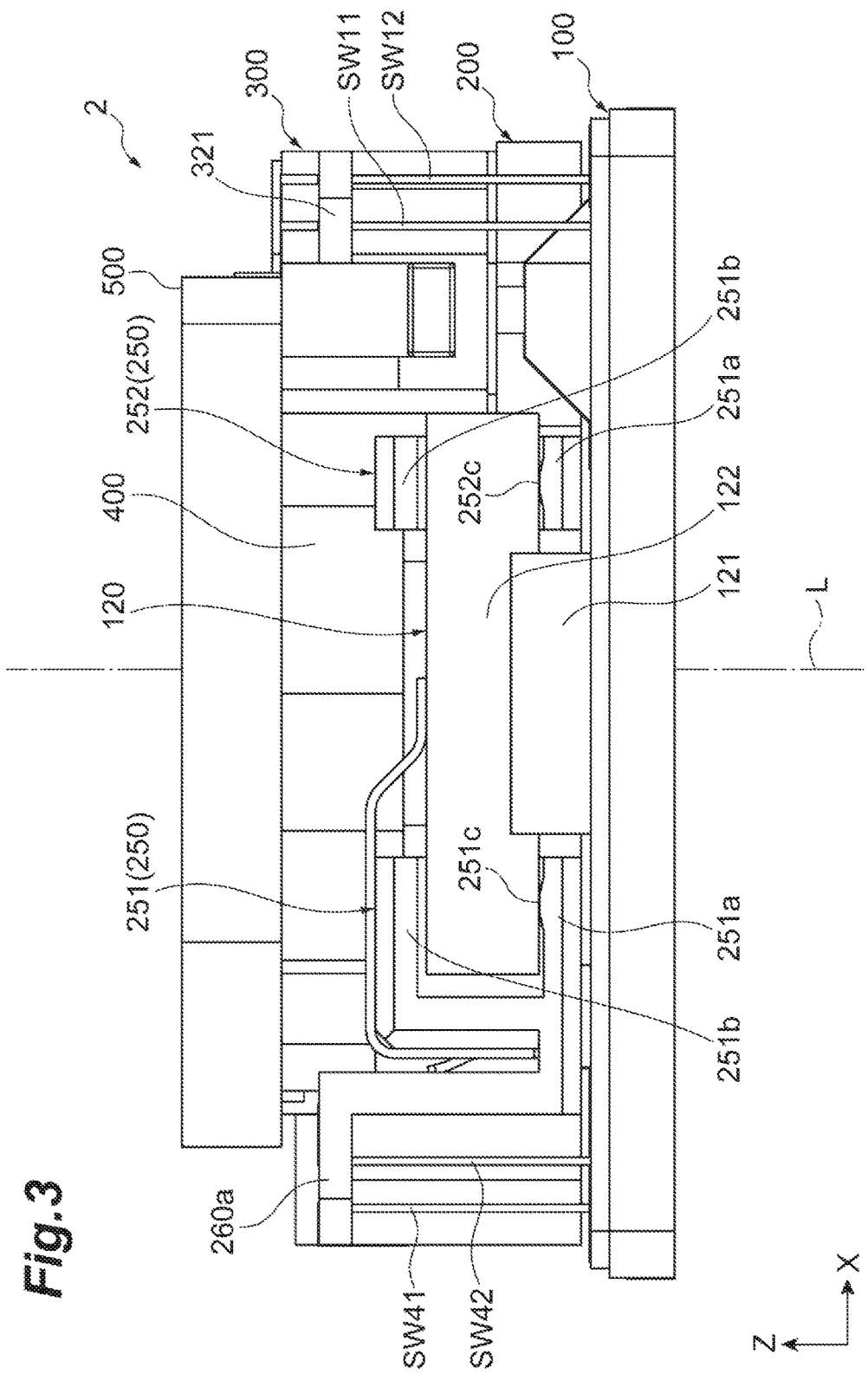
FIG. 3 is a lateral view when the lens drive unit of FIG. 2 is viewed from the side of an X-axis movable object holding portion.

As illustrated in FIGS. 1 to 3, the lens drive unit 2 includes a base member 100, an X-axis movable object 200, a Y-axis movable object 300, and a lens carrier 400. The base member 100, the X-axis movable object 200, the Y-axis movable object 300, and the lens carrier 400 are arranged along the direction of the optical axis L in this order. The lens drive unit 2 further includes an auxiliary member 500 that is disposed to cover a surrounding portion of the lens carrier 400.

Specifically, the X-axis movable object 200 is disposed to overlap the base member 100 in the direction of the optical axis L. The Y-axis movable object 300 is disposed to overlap the X-axis movable object 200 at the side opposite to the side (side which the base member 100 overlaps) provided with the base member 100, in the direction of the optical axis L. The lens carrier 400 is disposed to overlap the Y-axis movable object 300 at the side opposite to the side (side which the X-axis movable object 200 overlaps) provided with the X-axis movable object 200, in the direction of the optical axis L.

The X-axis movable object 200 is supported by the base member 100 to be movable relatively in the X-axis direction with respect to the base member 100. The Y-axis movable object 300 is supported by the X-axis movable object 200 to be movable relatively in the Y-axis direction with respect to the X-axis movable object 200. The lens carrier 400 is supported by the Y-axis movable object 300 to be movable in the direction of the optical axis L.

Figure 4:
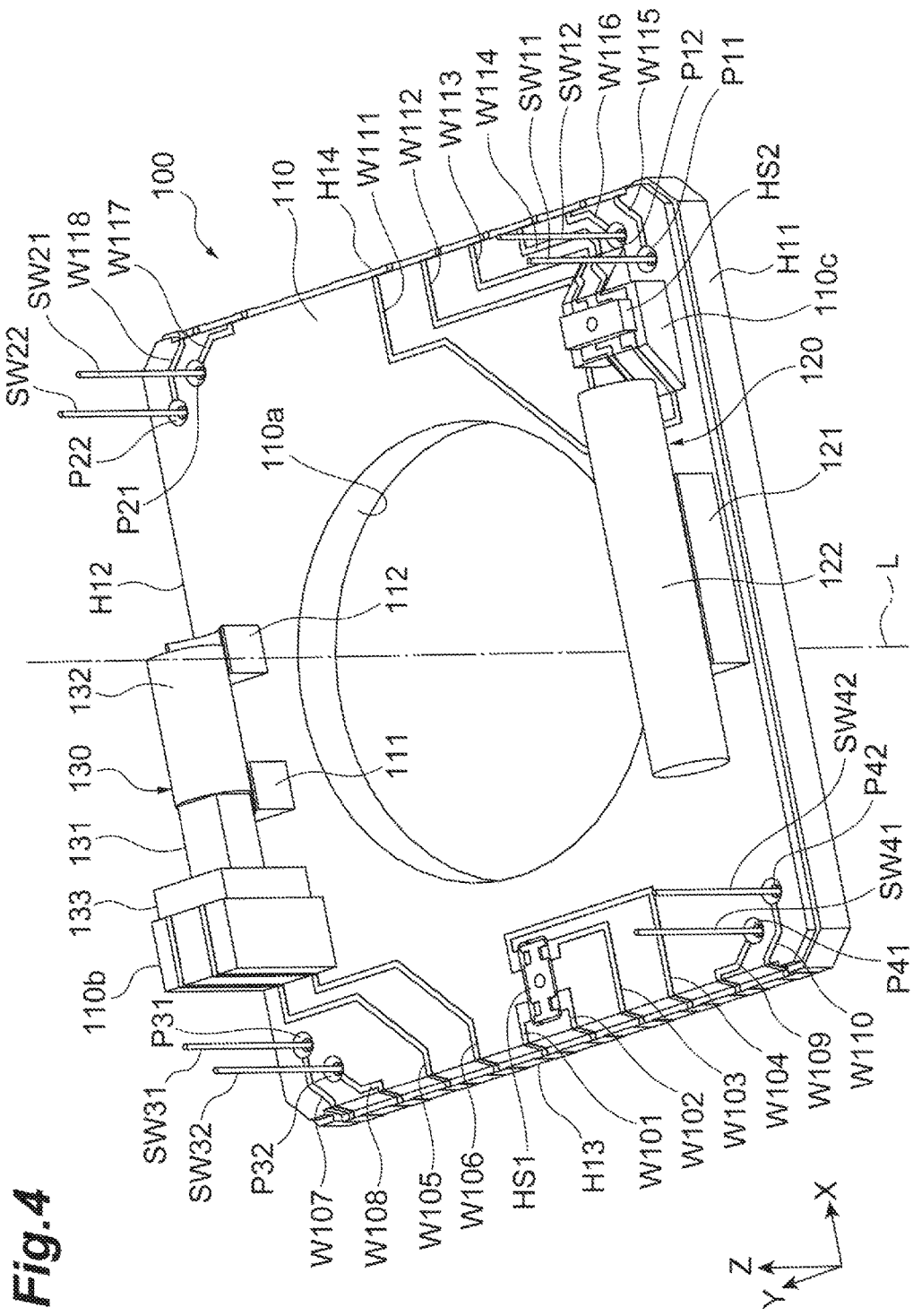
FIG. 4 is a perspective view illustrating a configuration of a base member.

First, a surrounding portion of the base member 100 will be described in detail. As illustrated in FIG. 4, the base member 100 includes a base body portion 110, a first convex portion 111, and a second convex portion 112. The base body portion 110 is an approximately rectangular member having four corner portions, when viewed from the direction of the optical axis L. For the convenience of description, four sides configuring an outer circumferential edge of the base body portion 110 when viewed from the direction of the optical axis L are called sides H11, H12, H13, and H14. The sides H11 and H12 are parallel to each other and extend along the X-axis direction. The sides H13 and H14 are parallel to each other and extend along the Y-axis direction. When the base body portion 110 is viewed from the direction of the optical axis L, the individual sides are connected in order of the sides H11, H14, H12, and H13 and the outer circumferential edge is formed.

A circular opening portion 110a with the optical axis L as a center is provided in the base body portion 110. The first convex portion 111 and the second convex portion 112 are provided on a surface of the base body portion 110 at the side of the X-axis movable object 200 (surface of the base body portion 110 at the side which the X-axis movable object 200 overlaps). The first convex portion 111 and the second convex portion 112 are provided in the same side with the side H12 against the opening portion 110a, on the surface of the base body portion 110. The first convex portion 111 and the second convex portion 112 are arranged in the X-axis direction. A predetermined gap is formed in the X-axis direction between the first convex portion 111 and the second convex portion 112. Grooves that extend along the X-axis direction and have an approximately V shape are provided in top surfaces (top portions) of the first convex portion 111 and the second convex portion 112, that is, surfaces of the first convex portion 111 and the second convex portion 112 at the side of the X-axis movable object 200. The base body portion 110 and the first convex portion 111 and the second convex portion 112 are integrally provided.

An X-axis movable object holding portion 120 is provided in the same side with the side H11 against the opening portion 110a, on the surface of the base body portion 110 at the side of the X-axis movable object 200. The X-axis movable object holding portion 120 includes a support portion 121 and a shaft portion 122. The support portion 121 is fixed on the surface of the base body portion 110 at the side of the X-axis movable object 200. The shaft portion 122 is formed in a columnar shape and is disposed to extend along the X-axis direction. The support portion 121 supports a center portion of the shaft portion 122. Gaps are provided between both end portions of the shaft portion 122 and the base body portion 110. The base body portion 110 and the X-axis movable object holding portion 120 are integrally provided.

An X-axis actuator 130 is provided in the same side with the side H12 against the opening portion 110a, on the surface of the base body portion 110 at the side of the X-axis movable object 200. The X-axis actuator 130 and the X-axis movable object holding portion 120 face each other with the optical axis L between the X-axis actuator 130 and the X-axis movable object holding portion 120.

The X-axis actuator 130 is an actuator that configures a smooth impact drive mechanism. The X-axis actuator 130 includes a prismatic X-axis piezoelectric element 131, an X-axis drive shaft 132, and a weight portion 133.

The X-axis piezoelectric element 131 is an element that can expand and contract in the X-axis direction. The X-axis piezoelectric element 131 is configured using a piezoelectric material. As the piezoelectric material, an inorganic piezoelectric material such as lead zirconate titanate (so-called PZT), crystal, lithium niobate (LiNbO$_3$), potassium tantalate niobate (K(Ta,Nb)O$_3$), barium titanate (BaTiO$_3$), lithium tantalate (LiTaO$_3$), and strontium titanate (SrTiO$_3$) can be used. The X-axis piezoelectric element 131 can have a lamination structure in which a plurality of piezoelectric layers made of the piezoelectric material and a plurality of electrode layers are alternately laminated. The expansion and the contraction of the X-axis piezoelectric element 131 can be controlled by controlling a voltage applied to the X-axis piezoelectric element 131.

The X-axis piezoelectric element 131 is not limited to the prismatic shape and may have a shape in which the X-axis piezoelectric element 131 can expand and contract in the X-axis direction, for example, a columnar shape.

The X-axis drive shaft 132 is formed in a columnar shape and is disposed such that an axis line of a columnar shape extends along the X-axis direction. The X-axis drive shaft 132 is configured using a composite resin material including a fiber such as a carbon fiber.

One end portion of the X-axis direction in the X-axis drive shaft 132 is fixed on one end portion of the X-axis direction in the X-axis piezoelectric element 131. The surface of the X-axis drive shaft 132 at the side of the base body portion 110 is supported by the first convex portion 111 and the second convex portion 112 provided in the base body portion 110. The X-axis drive shaft 132 is not fixed on the first convex portion 111 and the second convex portion 112 and is slidable along the X-axis direction with respect to the first convex portion 111 and the second convex portion 112.

The weight portion 133 is fixed on the other end portion of the X-axis direction in the X-axis piezoelectric element 131. The weight portion 133 is formed of a material having a high specific gravity such as tungsten and a tungsten alloy and is designed to be heavier than the X-axis drive shaft 132. By designing the weight portion 133 to be heavier than the X-axis drive shaft 132, when the X-axis piezoelectric element 131 expands and contracts, the weight portion 133 is hard to be displaced and the X-axis drive shaft 132 can be efficiently displaced.

An actuator holding portion 110b that rises to the side of the X-axis movable object 200 is provided on the surface of the base body portion 110 at the side of the X-axis movable object 200. The surface of the weight portion 133 at the side opposite to the side on which the X-axis piezoelectric element 131 is fixed on the actuator holding portion 110b. As a result, the X-axis actuator 130 is fixed on the actuator holding portion 110b while the X-axis drive shaft 132 is supported by the first convex portion 111 and the second convex portion 112.

An adhesive such as an epoxy adhesive can be used for fixation of the X-axis piezoelectric element 131 and the X-axis drive shaft 132, fixation of the X-axis piezoelectric element 131 and the weight portion 133, and fixation of the weight portion 133 and the actuator holding portion 110b.

Figure 5:
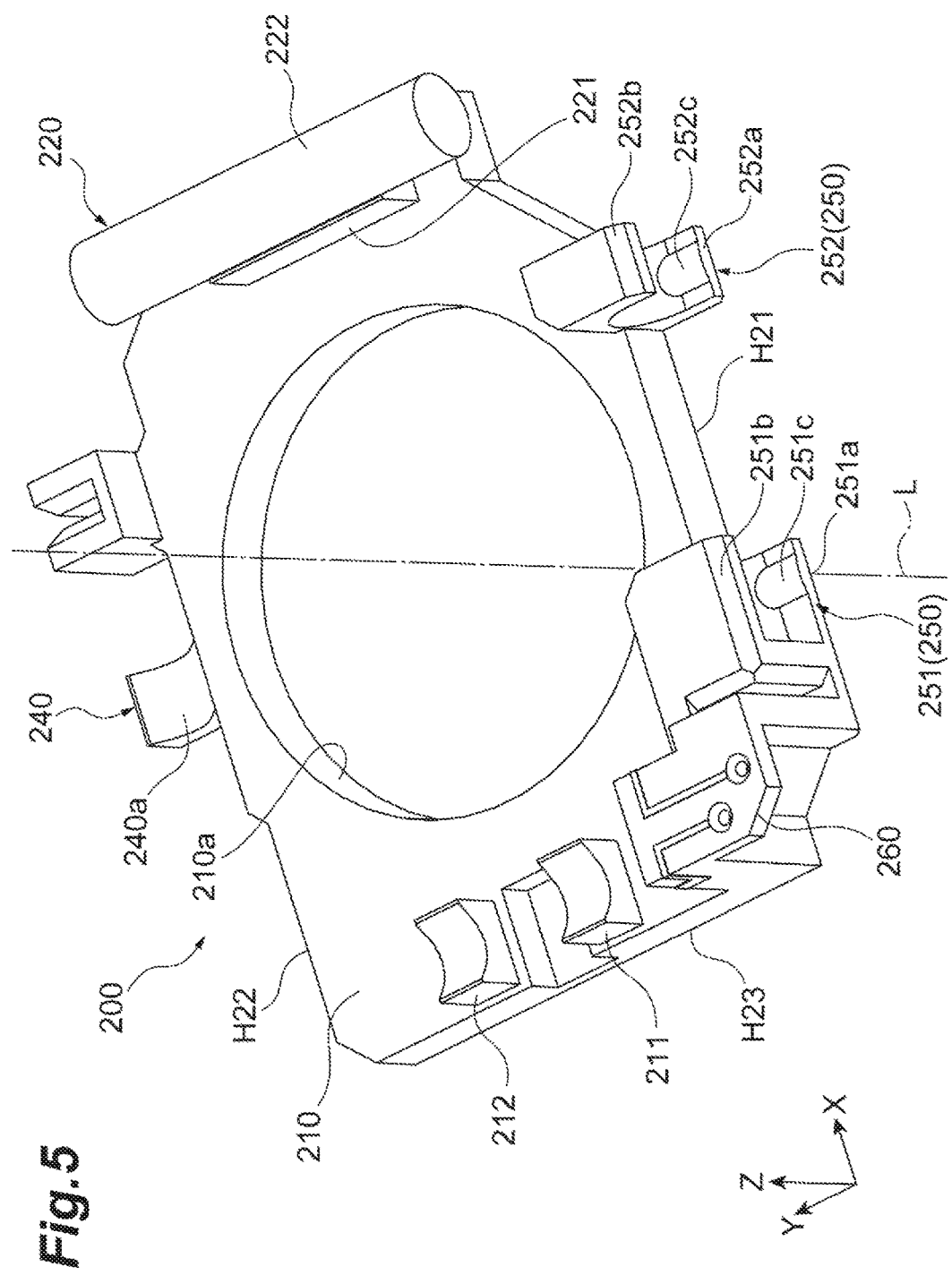
FIG. 5 is a perspective view illustrating a configuration of an X-axis movable object.

Next, a configuration of the X-axis movable object 200 and a support configuration of the X-axis movable object 200 by the base member 100 will be described in detail. As illustrated in FIG. 5, the X-axis movable object 200 includes an X-axis movable object body portion 210, a first convex portion 211, a second convex portion 212, an X-axis friction engagement portion 240, and an X-axis support portion 250.

The X-axis movable object body portion 210 is an approximately rectangular member having four corner portions, when viewed from the direction of the optical axis L. For the convenience of description, four sides configuring an outer circumferential edge of the X-axis movable object body portion 210 when viewed from the direction of the optical axis L are called sides H21, H22, H23, and H24 (refer to FIG. 7). A circular opening portion 210a with the optical axis L as a center is provided in the X-axis movable object body portion 210. The opening portion 210a provided in the X-axis movable object body portion 210 and the opening portion 110a provided in the base body portion 110 have almost the same sizes.

As illustrated in FIGS. 4 to 7, the side H21 is a side located at the side of the side H11 of the base member 100 with respect to the opening portion 210a, when viewed from the direction of the optical axis L in a state in which the X-axis movable object 200 overlaps the base member 100. Likewise, the side H22 is a side located at the side of the side H12 of the base member 100 with respect to the opening portion 210a. The side H23 is a side located at the side of the side H13 of the base member 100 with respect to the opening portion 210a. The side H24 is a side located at the side of the side H14 of the base member 100 with respect to the opening portion 210a.

The first convex portion 211 and the second convex portion 212 are provided on a surface of the X-axis movable object body portion 210 at the side of the Y-axis movable object 300 (surface of the X-axis movable object body portion 210 at the side which the Y-axis movable object 300 overlaps). The first convex portion 211 and the second convex portion 212 are provided in the same side with the side H23 against the opening portion 210a, on the surface of the X-axis movable object body portion 210. The first convex portion 211 and the second convex portion 212 are arranged in the Y-axis direction. A predetermined gap is formed in the Y-axis direction between the first convex portion 211 and the second convex portion 212. Grooves that extend along the Y-axis direction and have an approximately V shape are provided in top surfaces (top portions) of the first convex portion 211 and the second convex portion 212, that is, surfaces of the first convex portion 211 and the second convex portion 212 at the side of the Y-axis movable object 300. The X-axis movable object body portion 210 and the first convex portion 211 and the second convex portion 212 are integrally provided.

A Y-axis movable object holding portion 220 is provided in the same side with the side H24 against the opening portion 210a, on the surface of the X-axis movable object body portion 210 at the side of the Y-axis movable object 300. The Y-axis movable object holding portion 220 includes a support portion 221 and a shaft portion 222. The support portion 221 is fixed on the surface of the X-axis movable object body portion 210 at the side of the Y-axis movable object 300. The shaft portion 222 is formed in a columnar shape and is disposed to extend along the Y-axis direction. The support portion 221 supports a center portion of the shaft portion 222. Gaps are provided between both end portions of the shaft portion 222 and the X-axis movable object body portion 210. The X-axis movable object body portion 210 and the Y-axis movable object holding portion 220 are integrally provided.

The X-axis friction engagement portion 240 is provided in an end portion of the X-axis movable object body portion 210 at the side of the side H22. The X-axis friction engagement portion 240 protrudes in a direction separated from the opening portion 210a along the Y-axis direction, from the X-axis movable object body portion 210. A groove that extends along the X-axis direction and has an approximately V shape is provided in a surface of the X-axis friction engagement portion 240 at the side of the Y-axis movable object 300. Hereinafter, the surface of the X-axis friction engagement portion 240 provided with the groove of the V shape is called a V-shaped surface 240a.

The X-axis support portion 250 is provided in an end portion of the X-axis movable object body portion 210 at the side of the side H21. The X-axis support portion 250 includes a first X-axis support portion 251 and a second X-axis support portion 252. The first X-axis support portion 251 is located in the same side with the side H23 against the second X-axis support portion 252.

The first X-axis support portion 251 includes a pair of plate portions 251a and 251b and a raised portion 251c. The pair of plate portions 251a and 251b extends from the end portion of the X-axis movable object body portion 210 at the side of the side H21 to the side separated from the opening portion 210a along the Y-axis direction. A predetermined gap capable of inserting the end portion of the shaft portion 122 of the X-axis movable object holding portion 120 is provided in the direction of the optical axis L between the plate portions 251a and 251b. The plate portion 251a is located in the same side with the base member 100 against the plate portion 251b. The raised portion 251c is provided on a surface of the plate portion 251a at the side of the plate portion 251b. In the raised portion 251c, a top portion extends along the Y-axis direction. The raised portion 251c protrudes from the plate portion 251a, such that a cross section in the X-axis direction has an approximately circular arc shape.

The second X-axis support portion 252 includes a pair of plate portions 252a and 252b and a raised portion 252c. The pair of plate portions 252a and 252b extends from the end portion of the X-axis movable object body portion 210 at the side of the side H21 to the side separated from the opening portion 210a along the Y-axis direction. A predetermined gap capable of inserting the end portion of the shaft portion 122 of the X-axis movable object holding portion 120 is provided in the direction of the optical axis L between the plate portions 252a and 252b. The plate portion 252a is located in the same side with the base member 100 against the plate portion 252b. The raised portion 252c is provided on a surface of the plate portion 252a at the side of the plate portion 252b. In the raised portion 252c, a top portion extends along the Y-axis direction. The raised portion 252c protrudes from the plate portion 252a, such that a cross section in the X-axis direction has an approximately circular arc shape.

Next, a state in which the X-axis movable object 200 overlaps the base member 100 will be described. As illustrated in FIGS. 6 to 9, in a state in which the X-axis movable object 200 overlaps the base member 100, both end portions of the shaft portion 122 of the X-axis movable object holding portion 120 are fitted between the plate portions 251a and 251b of the X-axis support portion 250 and between the plate portions 252a and 252b of the X-axis support portion 250, respectively.

In addition, the X-axis movable object body portion 210 is provided with a pressing member 253 of which one end portion is fixed on the X-axis movable object body portion 210 and the other end portion comes into contact with the shaft portion 122 of the X-axis movable object holding portion 120. The pressing member 253 has elasticity. The other end portion of the pressing member 253 comes into contact with the shaft portion 122, so that the pressing member 253 lifts the X-axis movable object body portion 210 in a direction separated from the base body portion 110.

As a result, an outer circumferential surface of the shaft portion 122 of the X-axis movable object holding portion 120 and the raised portion 251c of the first X-axis support portion 251 and the raised portion 252c of the second X-axis support portion 252 come into contact with each other. In addition, the outer circumferential surface of the shaft portion 122 and the raised portions 251c and 252c come into point contact with each other. The raised portion 251c of the first X-axis support portion 251 and the raised portion 252c of the second X-axis support portion 252 come into contact with the outer circumferential surface of the shaft portion 122 of the X-axis movable object holding portion 120 to be movable in at least the X-axis direction.

In a state in which the X-axis movable object 200 overlaps the base member 100, the X-axis friction engagement portion 240 is located between the first convex portion 111 and the second convex portion 112 provided in the base body portion 110. In addition, the X-axis friction engagement portion 240 is located between the X-axis drive shaft 132 of the X-axis actuator 130 and the base body portion 110.

In addition, the X-axis movable object body portion 210 is provided with a pressing member 241 of which one end portion is fixed on the X-axis movable object body portion 210 and the other end portion comes into contact with the X-axis drive shaft 132 of the X-axis actuator 130. The pressing member 241 has elasticity. The other end portion of the pressing member 241 comes into contact with the X-axis drive shaft 132, so that the pressing member 241 lifts the X-axis movable object body portion 210 in a direction separated from the base body portion 110.

As a result, the V-shaped surface 240a of the X-axis friction engagement portion 240 frictionally engages with an outer circumferential surface of the X-axis drive shaft 132 of the X-axis actuator 130. In addition, the outer circumferential surface of the X-axis drive shaft 132 and the V-shaped surface 240a come into line contact with each other in two lines. Specifically, one surface configuring a V shape in the V-shaped surface 240a and the outer circumferential surface of the X-axis drive shaft 132 come into line contact with each other and the other surface configuring the V shape in the V-shaped surface 240a and the outer circumferential surface of the X-axis drive shaft 132 come into line contact with each other.

In a state in which the X-axis friction engagement portion 240 frictionally engages with the X-axis drive shaft 132 of the X-axis actuator 130, the X-axis piezoelectric element 131 expands and contracts in the X-axis direction, so that the X-axis movable object 200 is moved in the X-axis direction.

Figure 10:
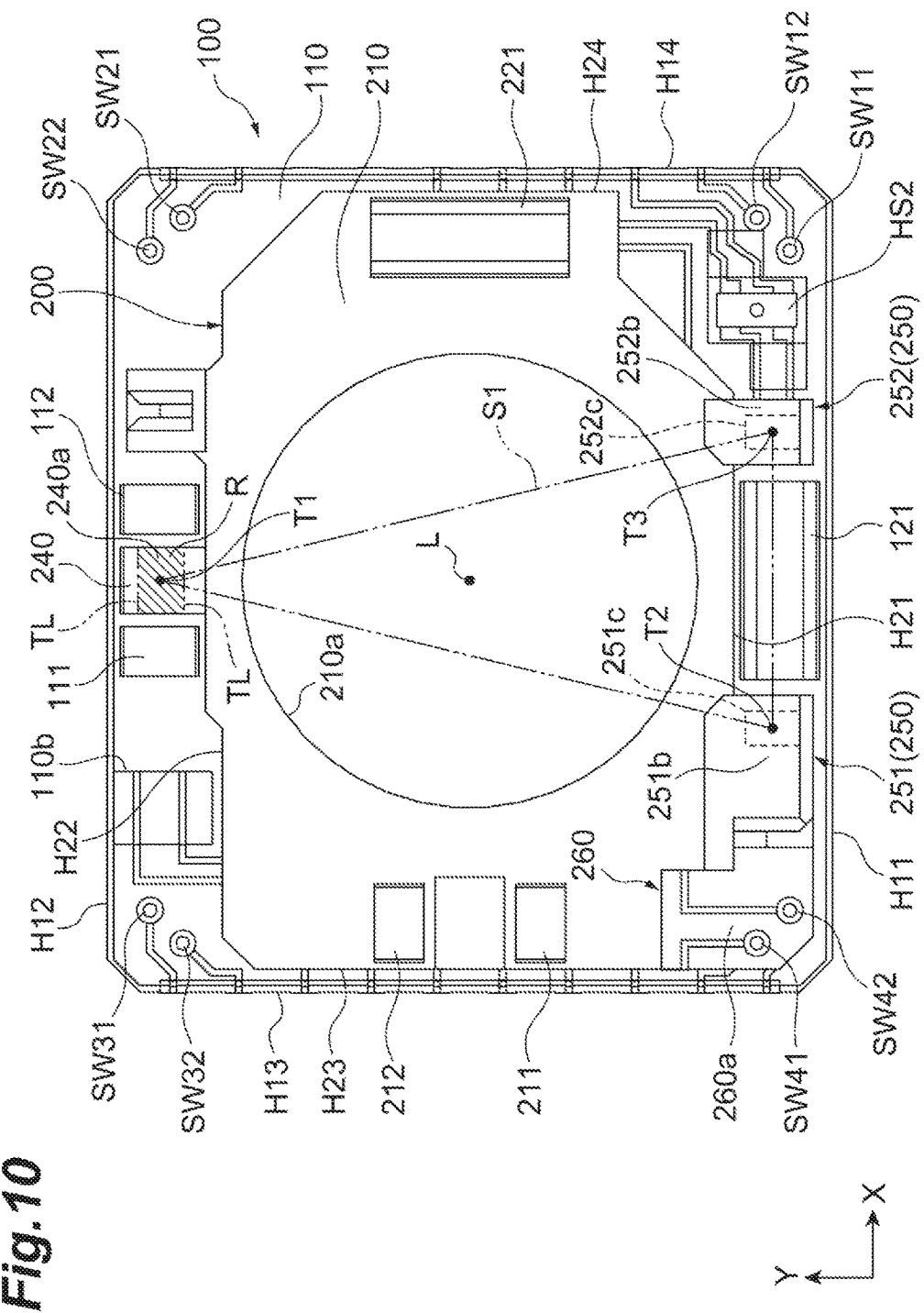
FIG. 10 is a plan view when a state in which a base body portion and an X-axis movable object body portion are combined is viewed from the side of an X-axis movable object body portion.

As illustrated in FIG. 10, a length of the X-axis direction in the X-axis friction engagement portion 240 is shorter than a length of the predetermined gap between the first convex portion 111 and the second convex portion 112 provided in the base body portion 110. That is, a movement of the X-axis direction in the X-axis friction engagement portion 240 is regulated by the first convex portion 111 and the second convex portion 112. As such, the first convex portion 111 and the second convex portion 112 provided in the base body portion 110 function as an X-axis stopper mechanism for regulating a movement range of the X-axis direction in the X-axis movable object 200.

The X-axis movable object 200 is held to be movable in the X-axis direction, in three places of the X-axis friction engagement portion 240, the first X-axis support portion 251, and the second X-axis support portion 252, with respect to the base member 100. In addition, the pressing members 241 and 253 lift the X-axis movable object body portion 210, so that the X-axis movable object body portion 210 floats from the base body portion 110.

Figure 6:
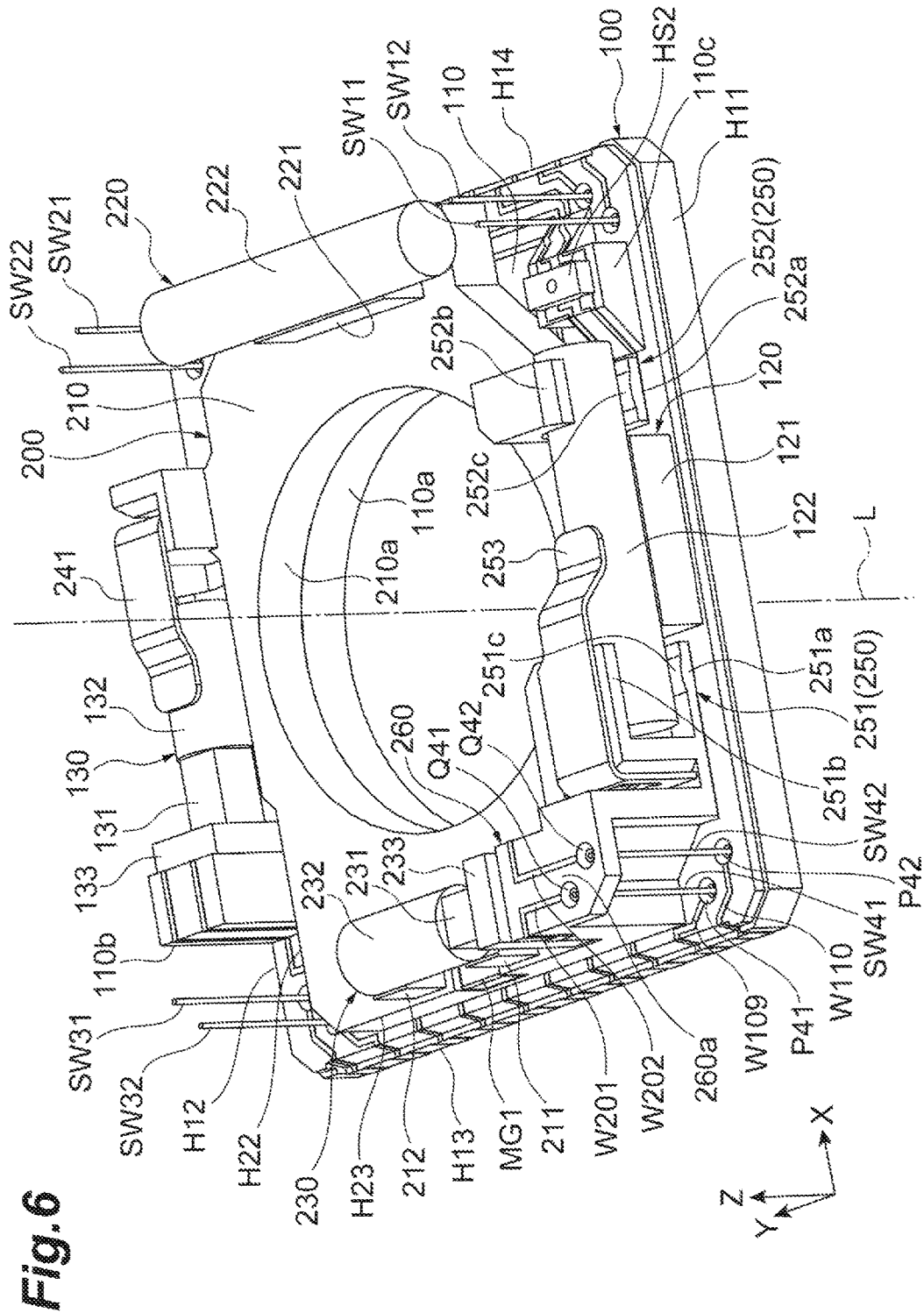
FIG. 6 is a perspective view when a state in which the base member and the X-axis movable object are combined is viewed from the side of the X-axis movable object holding portion.
Figure 7:
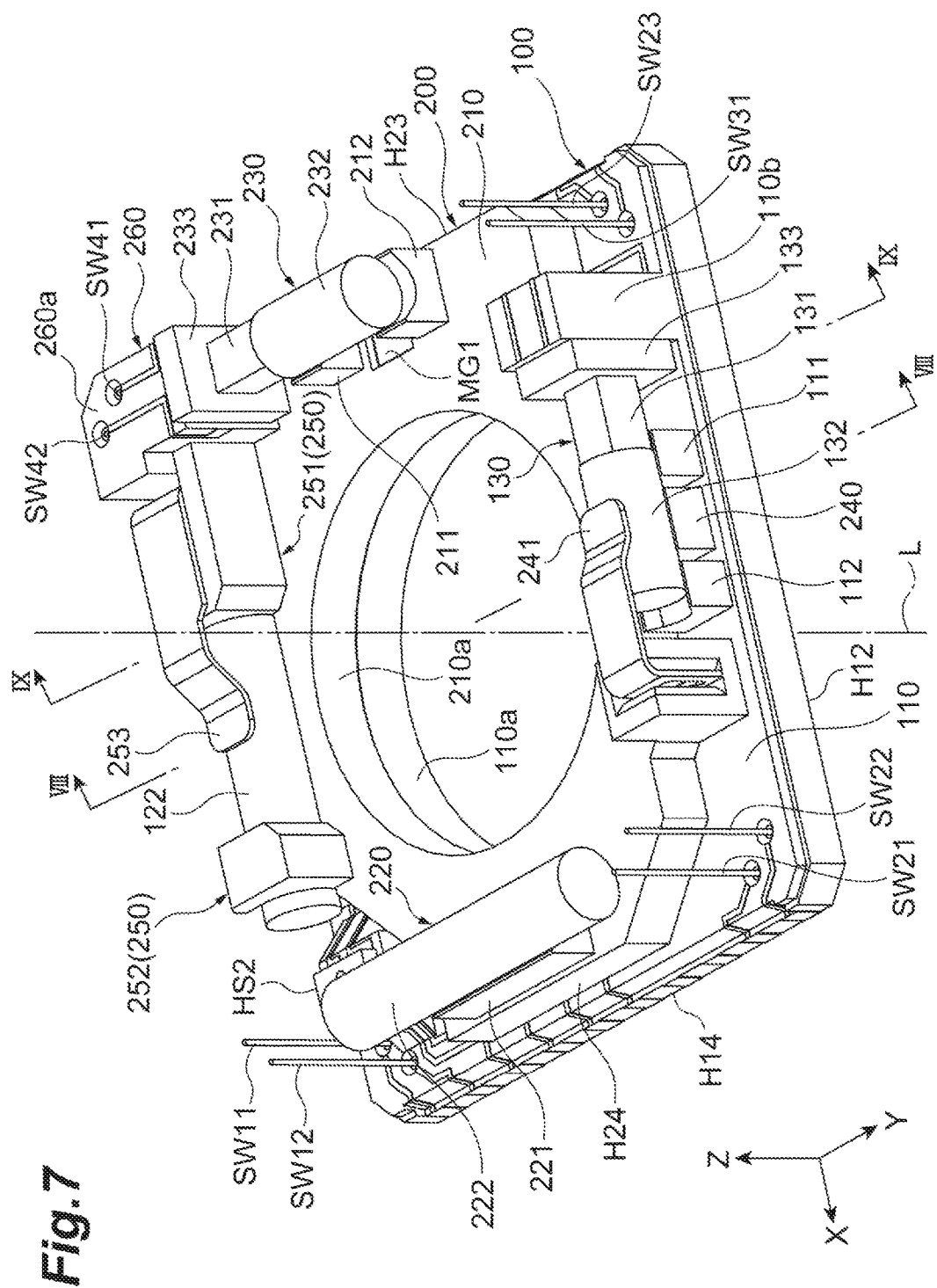
FIG. 7 is a perspective view when a state in which the base member and the X-axis movable object are combined is viewed from the side of the X-axis actuator.
Figure 8:
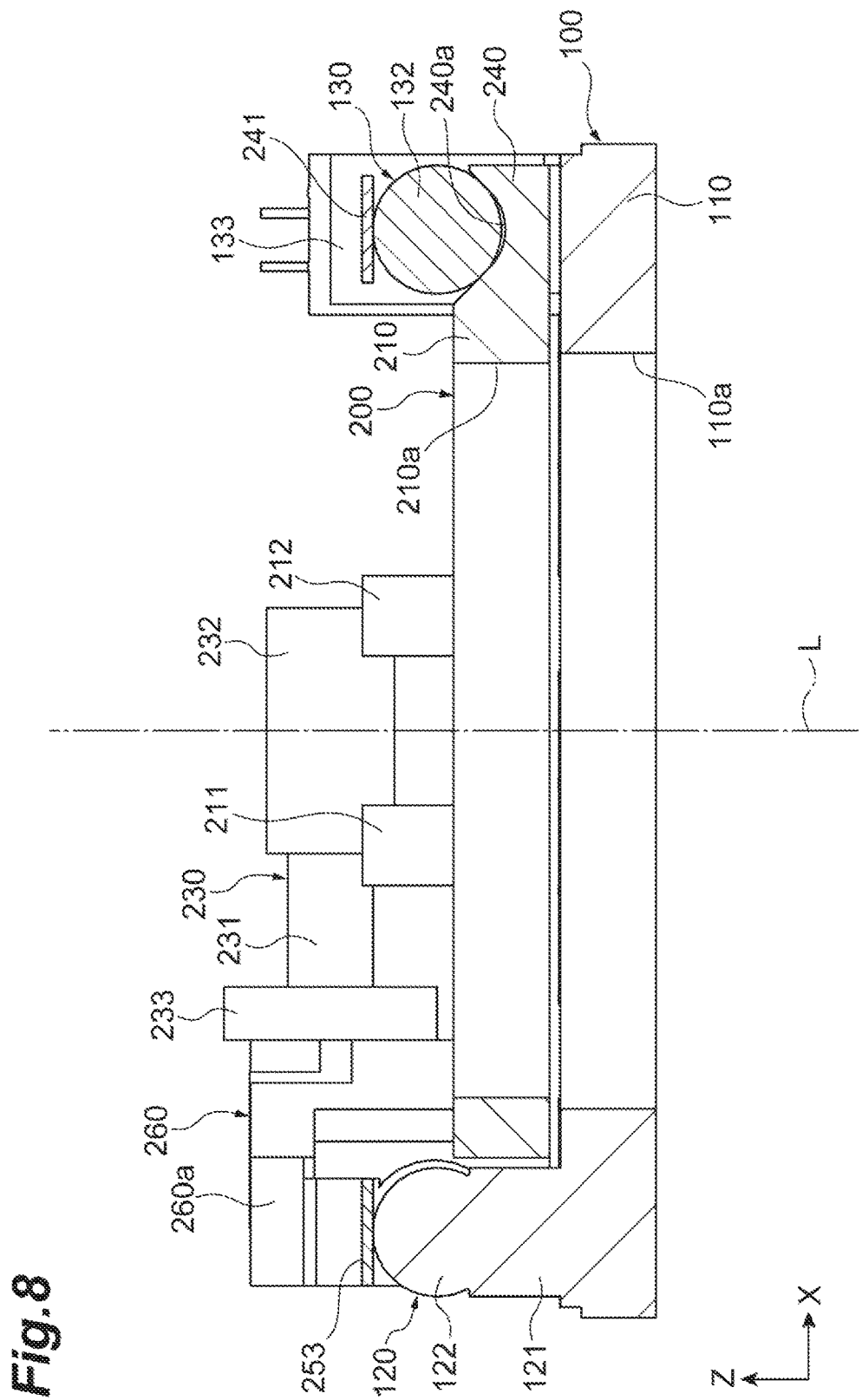
FIG. 8 is a cross-sectional view taken along the line VIII-VIII of FIG. 7.
Figure 9:
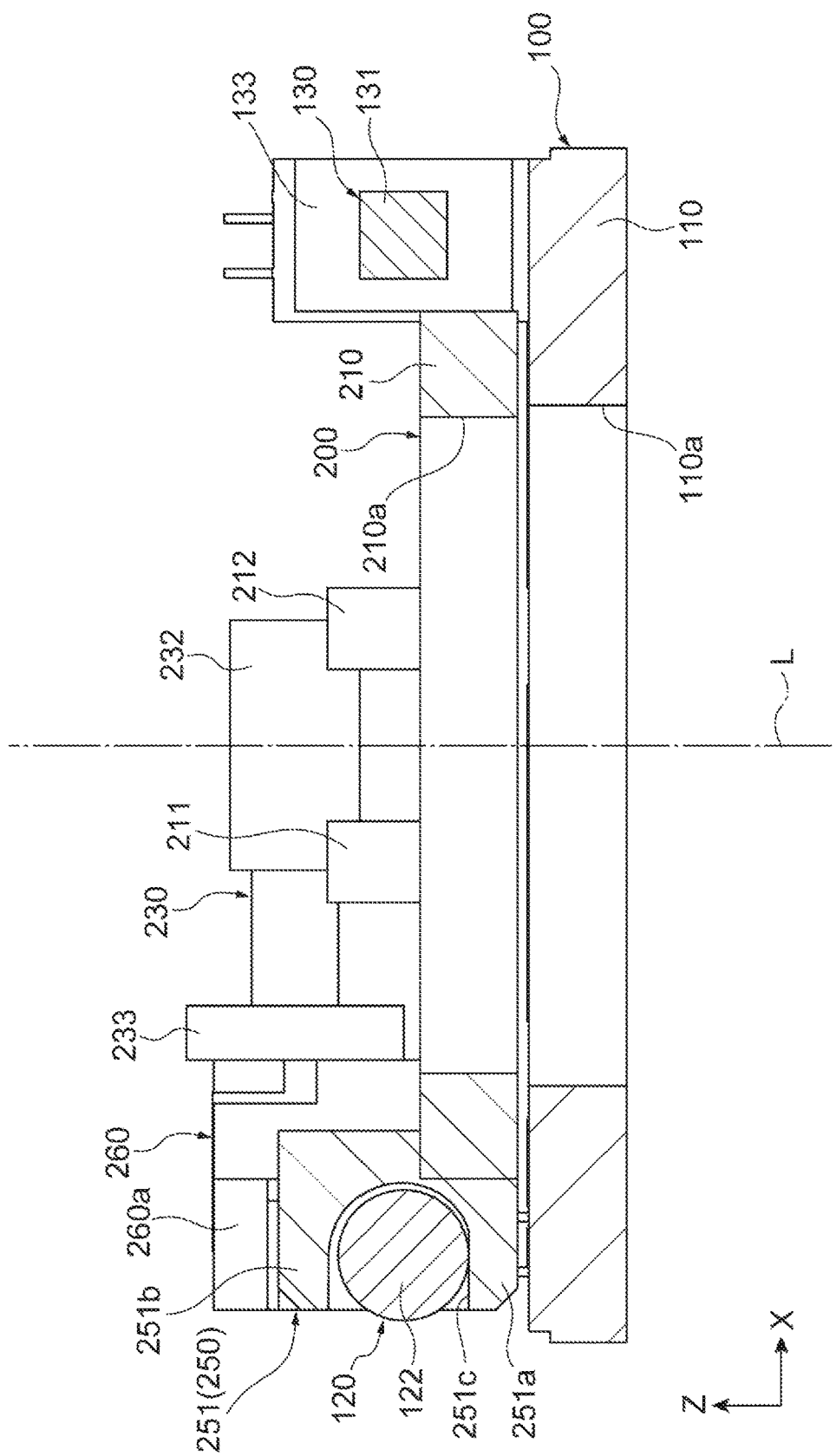
FIG. 9 is a cross-sectional view taken along the line IX-IX of FIG. 7.

As illustrated in FIGS. 6 and 7, a Y-axis actuator 230 is provided in the same side with the side H23 against the opening portion 210a, on the surface of the X-axis movable object body portion 210 at the side of the Y-axis movable object 300. The Y-axis actuator 230 and the Y-axis movable object holding portion 220 face each other with the optical axis L between the Y-axis actuator 230 and the Y-axis movable object holding portion 220.

The Y-axis actuator 230 is an actuator that configures a smooth impact drive mechanism. The Y-axis actuator 230 includes a prismatic Y-axis piezoelectric element 231, a Y-axis drive shaft 232, and a weight portion 233. The Y-axis piezoelectric element 231 is an element that can expand and contract in the Y-axis direction. The Y-axis piezoelectric element 231 has the same configuration as the configuration of the X-axis piezoelectric element 131 of the X-axis actuator 130. The expansion and the contraction of the Y-axis piezoelectric element 231 can be controlled by controlling a voltage applied to the Y-axis piezoelectric element 231.

The Y-axis drive shaft 232 is formed in a columnar shape and is disposed such that an axis line of a columnar shape extends along the Y-axis direction. The Y-axis drive shaft 232 is configured using a composite resin material including a fiber such as a carbon fiber, similar to the X-axis drive shaft 132.

One end portion of the Y-axis direction in the Y-axis drive shaft 232 is fixed on one end portion of the Y-axis direction in the Y-axis piezoelectric element 231. The surface of the Y-axis drive shaft 232 at the side of the X-axis movable object body portion 210 is supported by the first convex portion 211 and the second convex portion 212 provided in the X-axis movable object body portion 210. The Y-axis drive shaft 232 is not fixed on the first convex portion 211 and the second convex portion 212 and is slidable along the Y-axis direction with respect to the first convex portion 211 and the second convex portion 212.

The weight portion 233 is fixed on the other end portion of the Y-axis direction in the Y-axis piezoelectric element 231. The weight portion 233 is designed to be heavier than the Y-axis drive shaft 232, similar to the weight portion 133.

A rising portion 260 is provided on the surface of the X-axis movable object body portion 210 at the side of the Y-axis movable object 300. The rising portion 260 rises from the corner portion of the X-axis movable object body portion 210 in which the sides H21 and H23 are connected and projects from a position of an upper end portion of the rising portion to the outside (side separated from the opening portion 210a). In addition, a portion projecting to the outside in the rising portion 260 is called a projection portion 260a. The surface of the weight portion 233 at the side opposite to the side on which the Y-axis piezoelectric element 231 is fixed is fixed on a surface of the rising portion 260 at the side of the first convex portion 211. As a result, the Y-axis actuator 230 is fixed on the rising portion 260 while the Y-axis drive shaft 232 is supported by the first convex portion 211 and the second convex portion 212.

An adhesive such as an epoxy adhesive can be used for fixation of the Y-axis piezoelectric element 231 and the Y-axis drive shaft 232, fixation of the Y-axis piezoelectric element 231 and the weight portion 233, and fixation of the weight portion 233 and the rising portion 260.

Figure 11:
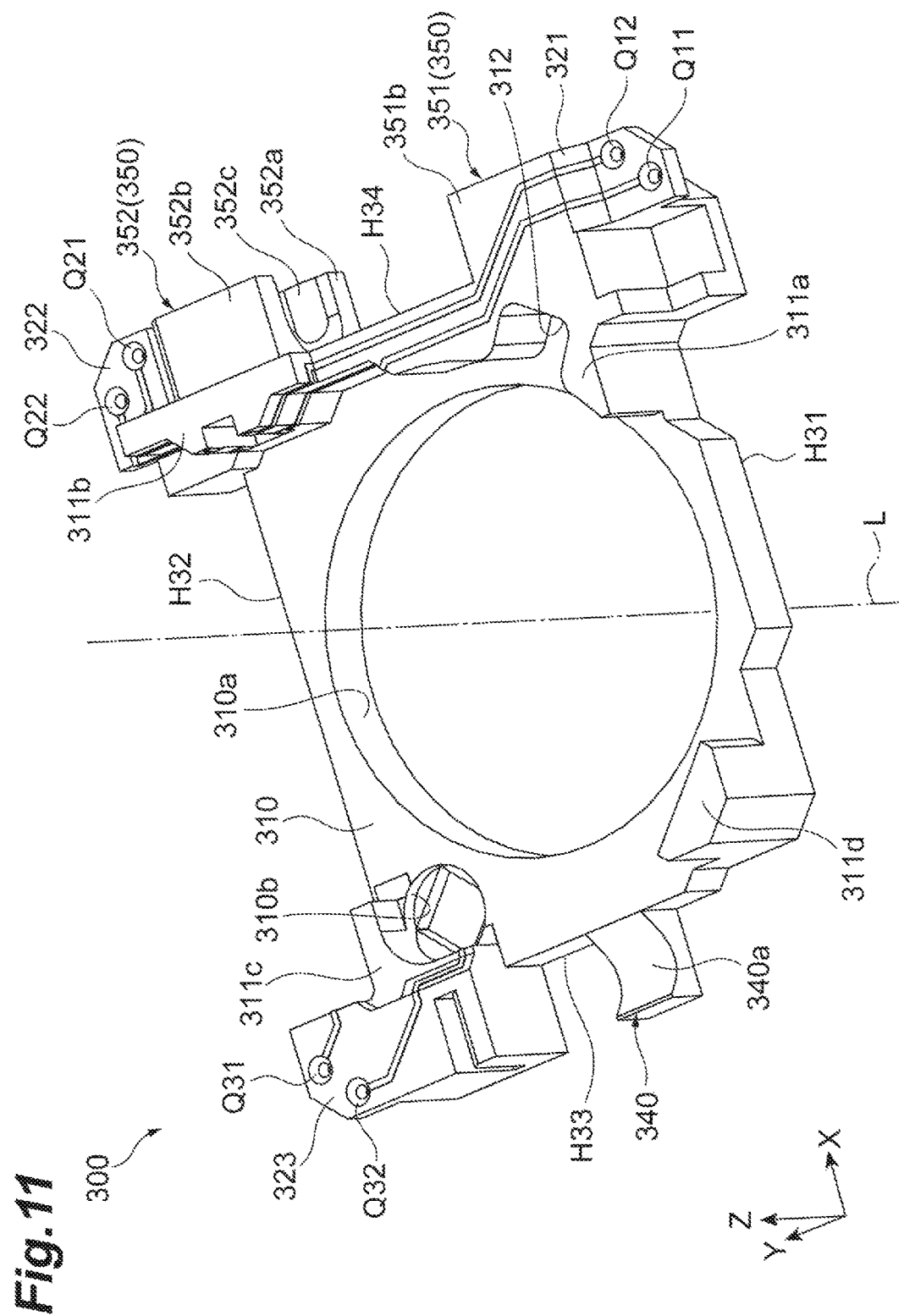
FIG. 11 is a perspective view illustrating a configuration of a Y-axis movable object.

Next, a configuration of the Y-axis movable object 300 and a support configuration of the Y-axis movable object 300 by the X-axis movable object 200 will be described in detail. As illustrated in FIG. 11, the Y-axis movable object 300 includes a Y-axis movable object body portion 310, a first sidewall portion 311a, a second sidewall portion 311b, a third sidewall portion 311c, a fourth sidewall portion 311d, a Y-axis friction engagement portion 340, and a Y-axis support portion 350.

The Y-axis movable object body portion 310 is an approximately rectangular member having four corner portions, when viewed from the direction of the optical axis L. For the convenience of description, four sides configuring an outer circumferential edge of the Y-axis movable object body portion 310 when viewed from the direction of the optical axis L are called sides H31, H32, H33, and H34. A circular opening portion 310a with the optical axis L as a center is provided in the Y-axis movable object body portion 310. The opening portion 310a provided in the Y-axis movable object body portion 310 and the opening portion 210a provided in the X-axis movable object body portion 210 have almost the same sizes.

Figure 15:
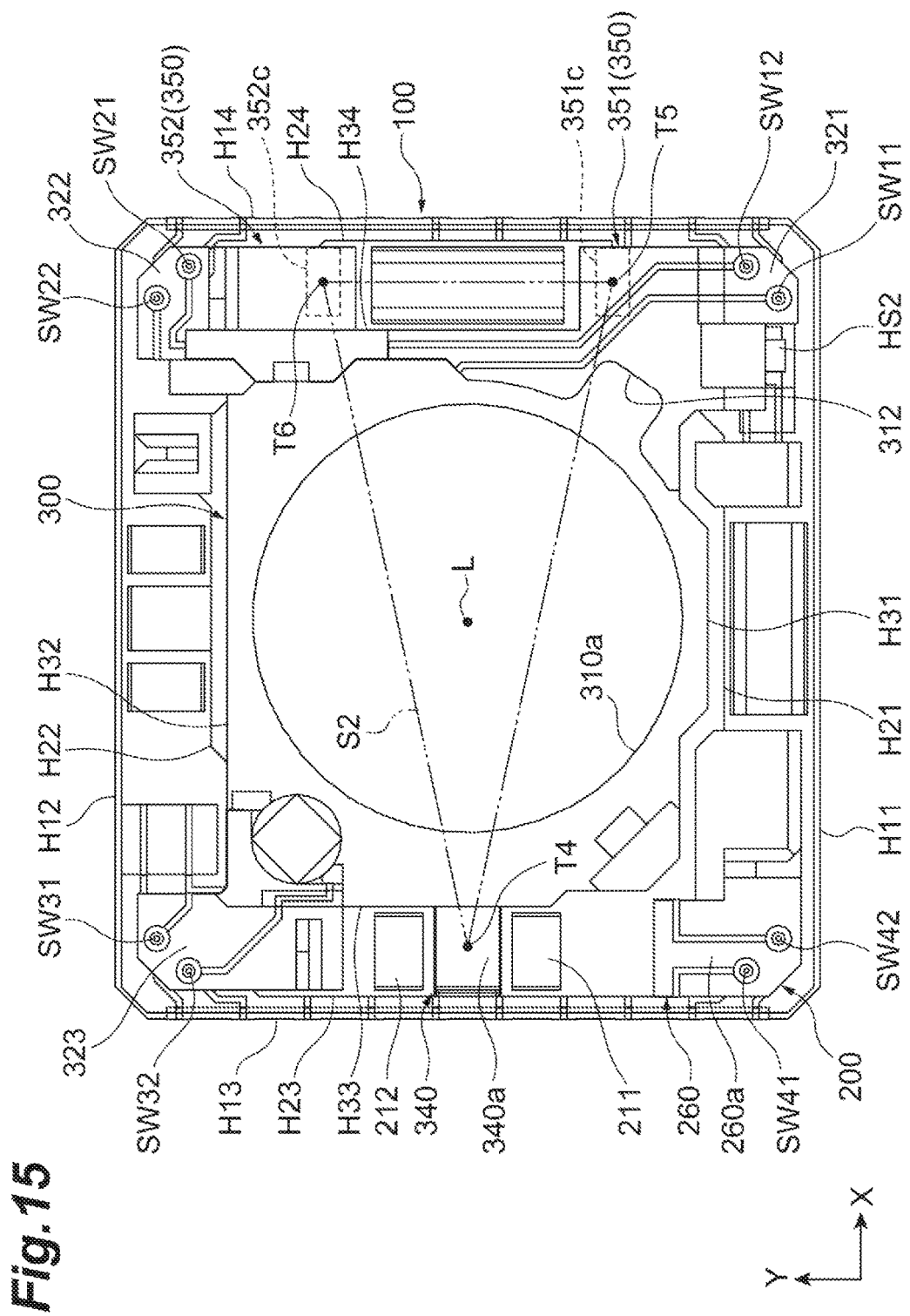
FIG. 15 is a plan view illustrating a state in which the base body portion, the X-axis movable object body portion, and the Y-axis movable object are combined.

As illustrated in FIGS. 11 and 15, the side H31 is a side located at the side of the side H21 of the X-axis movable object 200 with respect to the opening portion 310a, when viewed from the direction of the optical axis L in a state in which the Y-axis movable object 300 overlaps the X-axis movable object 200. Likewise, the side H32 is a side located at the side of the side H22 of the X-axis movable object 200 with respect to the opening portion 310a. The side H33 is a side located at the side of the side H23 of the X-axis movable object 200 with respect to the opening portion 310a. The side H34 is a side located at the side of the side H24 of the X-axis movable object 200 with respect to the opening portion 310a.

As illustrated in FIG. 11, the first sidewall portion 311a rises from the Y-axis movable object body portion 310 to the side of the lens carrier 400, in the corner portion of the Y-axis movable object body portion 310 in which the sides H31 and H34 are connected. In the first sidewall portion 311a, a notch portion 312 extending along the direction of the optical axis L is provided at a position corresponding to a locking convex portion 420 of the lens carrier 400. The second sidewall portion 311b rises from the Y-axis movable object body portion 310 to the side of the lens carrier 400, in the corner portion of the Y-axis movable object body portion 310 in which the sides H34 and H32 are connected. In addition, the first sidewall portion 311a and the second sidewall portion 311b extend along the side H34 of the Y-axis movable object body portion 310 and are connected to each other.

The third sidewall portion 311c rises from the Y-axis movable object body portion 310 to the side of the lens carrier 400, in the corner portion of the Y-axis movable object body portion 310 in which the sides H32 and H33 are connected. The fourth sidewall portion 311d rises from the Y-axis movable object body portion 310 to the side of the lens carrier 400, in the corner portion of the Y-axis movable object body portion 310 in which the sides H33 and H31 are connected.

An actuator holding portion 310b that is recessed in a circular shape is provided on the surface of the Y-axis movable object body portion 310 at the side of the lens carrier 400. The actuator holding portion 310b is located in a region between the third sidewall portion 311c and the opening portion 310a.

As illustrated in FIG. 11, the Y-axis friction engagement portion 340 is provided in an end portion of the Y-axis movable object body portion 310 at the side of the side H33. The Y-axis friction engagement portion 340 protrudes in a direction separated from the opening portion 310a along the X-axis direction, from the Y-axis movable object body portion 310. A groove that extends along the Y-axis direction and has an approximately V shape is provided on a surface of the Y-axis friction engagement portion 340 at the side of the lens carrier 400. Hereinafter, the surface of the Y-axis friction engagement portion 340 provided with the groove of the V shape is called a V-shaped surface 340a.

As illustrated in FIG. 11, the Y-axis support portion 350 is provided in an end portion of the Y-axis movable object body portion 310 at the side of the side H34. The Y-axis support portion 350 includes a first Y-axis support portion 351 and a second Y-axis support portion 352. The first Y-axis support portion 351 is located in the same side with the side H31 against the second Y-axis support portion 352.

Figure 14:
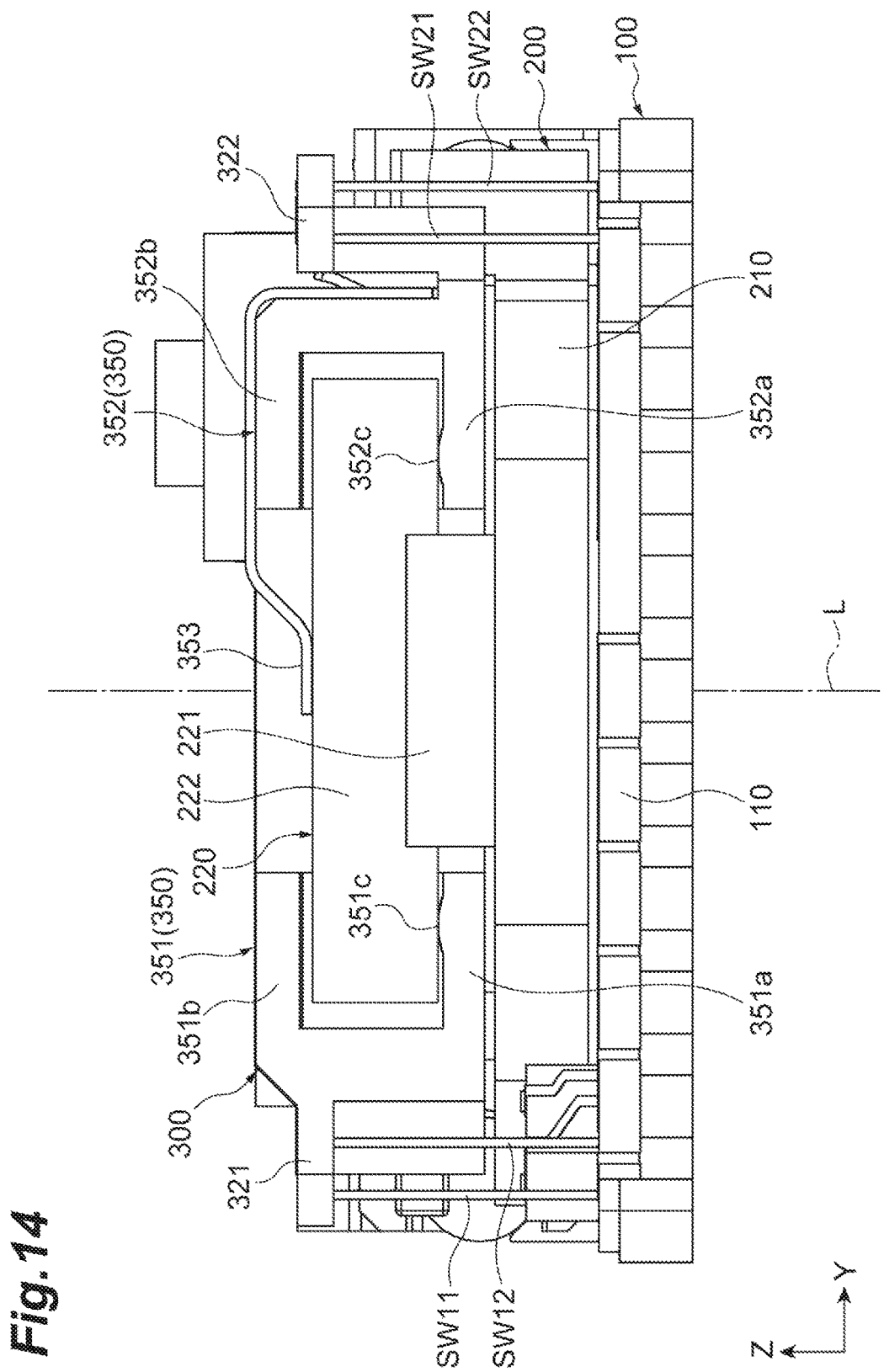
FIG. 14 is a lateral view when a state in which the base member, the X-axis movable object, and the Y-axis movable object are combined is viewed from the side of the Y-axis movable object holding portion.

The first Y-axis support portion 351 includes a pair of plate portions 351a and 351b and a raised portion 351c (refer to FIGS. 11 and 14). The pair of plate portions 351a and 351b extends from the end portion of the Y-axis movable object body portion 310 at the side of the side H34 to the side separated from the opening portion 310a along the X-axis direction. A predetermined gap capable of inserting the end portion of the shaft portion 222 of the Y-axis movable object holding portion 220 is provided in the direction of the optical axis L between the plate portions 351a and 351b. The plate portion 351a is located in the same side with the X-axis movable object 200 against the plate portion 351b. The raised portion 351c is provided on a surface of the plate portion 351a at the side of the plate portion 351b. In the raised portion 351c, a top portion extends along the X-axis direction. The raised portion 351c protrudes from the plate portion 351a, such that a cross section in the Y-axis direction has an approximately circular arc shape.

The second Y-axis support portion 352 includes a pair of plate portions 352a and 352b and a raised portion 352c (refer to FIGS. 11 and 14). The pair of plate portions 352a and 352b extends from the end portion of the Y-axis movable object body portion 310 at the side of the side H34 to the side separated from the opening portion 310a along the X-axis direction. A predetermined gap capable of inserting the end portion of the shaft portion 222 of the Y-axis movable object holding portion 220 is provided in the direction of the optical axis L between the plate portions 352a and 352b. The plate portion 352a is located in the same side with the X-axis movable object 200 against the plate portion 352b. The raised portion 352c is provided on a surface of the plate portion 352a at the side of the plate portion 352b. In the raised portion 352c, a top portion extends along the X-axis direction. The raised portion 352c protrudes from the plate portion 352a, such that a cross section in the Y-axis direction has an approximately circular arc shape.

The Y-axis movable object 300 further includes a first wiring line connection portion 321, a second wiring line connection portion 322, and a third wiring line connection portion 323. The first wiring line connection portion 321 projects from a position near a tip portion of a rising direction of the first sidewall portion 311a to the outside (side separated from the opening portion 310a). The second wiring line connection portion 322 projects from a position near a tip portion of a rising direction of the second sidewall portion 311b to the outside (side separated from the opening portion 310a). The third wiring line connection portion 323 projects from a position near a tip portion of a rising direction of the third sidewall portion 311c to the outside (side separated from the opening portion 310a).

Figure 12:
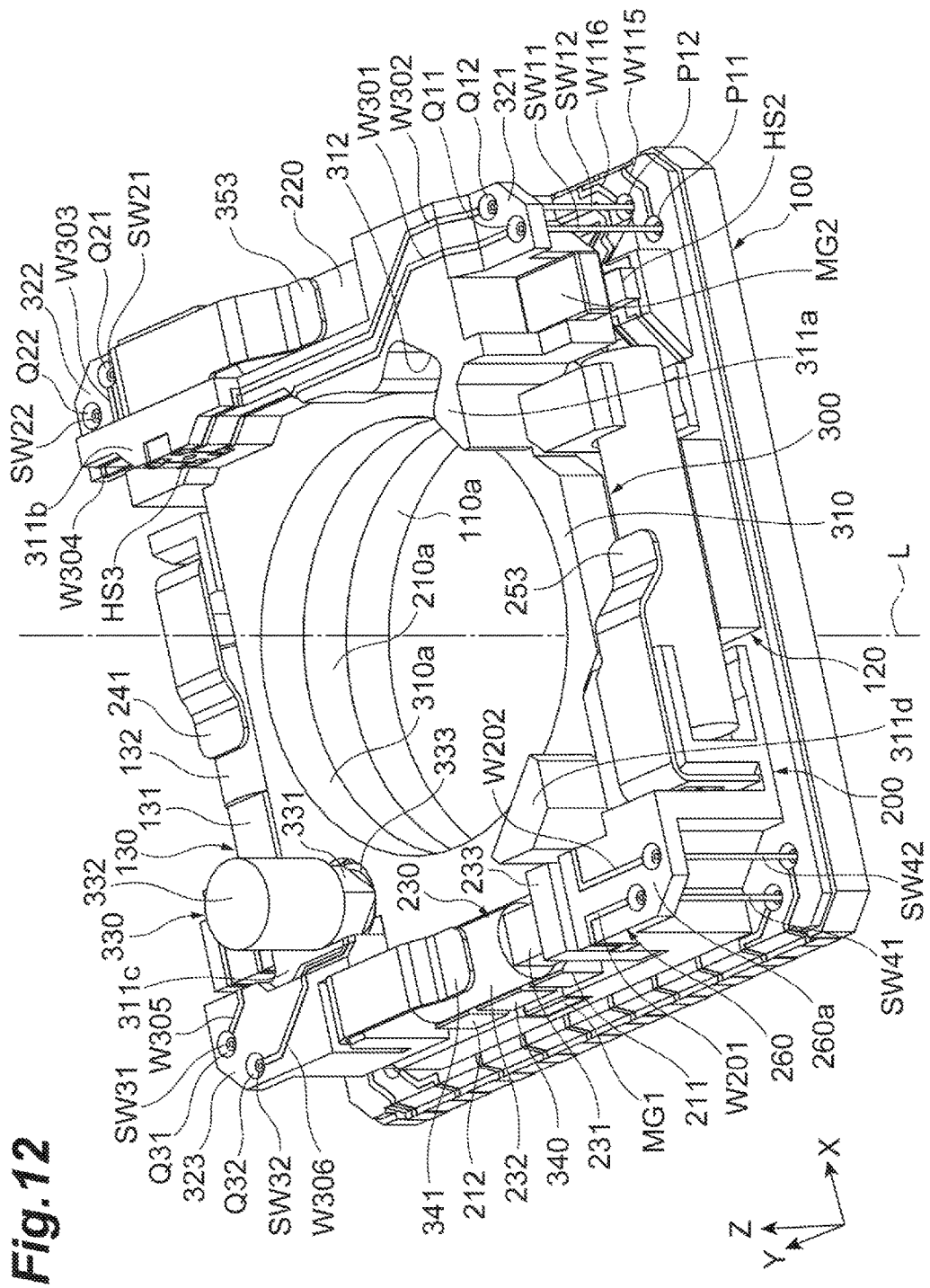
FIG. 12 is a perspective view when a state in which the base member, the X-axis movable object, and the Y-axis movable object are combined is viewed from the side of the X-axis movable object holding portion.
Figure 13:
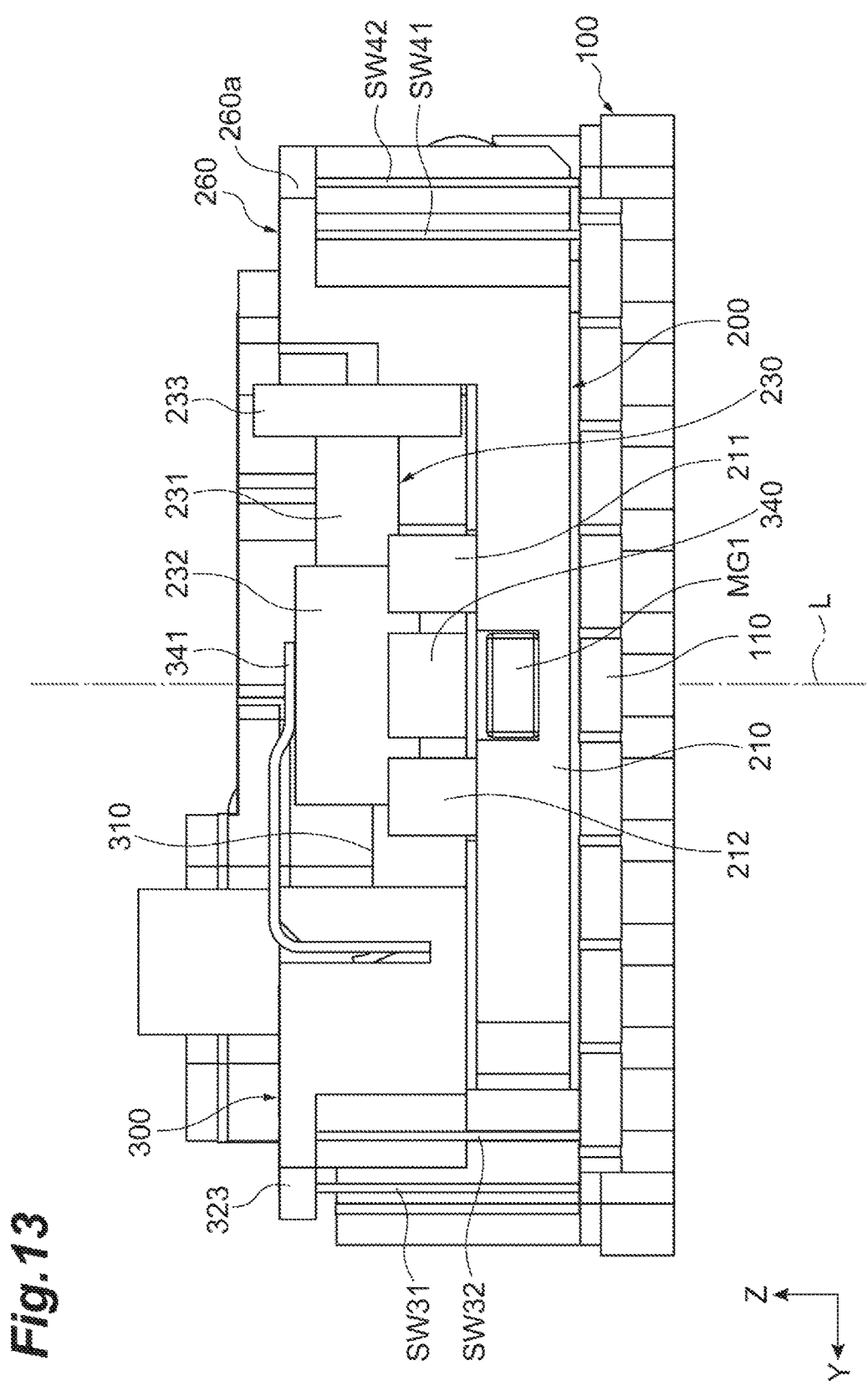
FIG. 13 is a lateral view when a state in which the base member, the X-axis movable object, and the Y-axis movable object are combined is viewed from the side of the Y-axis actuator.

Next, a state in which the Y-axis movable object 300 overlaps the X-axis movable object 200 will be described. As illustrated in FIGS. 12 to 14, in a state in which the Y-axis movable object 300 overlaps the X-axis movable object 200, both end portions of the shaft portion 222 of the Y-axis movable object holding portion 220 are fitted between the plate portions 351a and 351b of the Y-axis support portion 350 and between the plate portions 352a and 352b of the Y-axis support portion 350, respectively.

In addition, the Y-axis movable object body portion 310 is provided with a pressing member 353 of which one end portion is fixed on the Y-axis movable object body portion 310 and the other end portion comes into contact with the shaft portion 222 of the Y-axis movable object holding portion 220. The pressing member 353 has elasticity. The other end portion of the pressing member 353 comes into contact with the shaft portion 222, so that the pressing member 353 lifts the Y-axis movable object body portion 310 in a direction separated from the X-axis movable object body portion 210.

As a result, an outer circumferential surface of the shaft portion 222 of the Y-axis movable object holding portion 220 and the raised portion 351c of the first Y-axis support portion 351 and the raised portion 352c of the second Y-axis support portion 352 come into contact with each other. In addition, the outer circumferential surface of the shaft portion 222 and the raised portions 351c and 352c come into point contact with each other. The raised portion 351c of the first Y-axis support portion 351 and the raised portion 352c of the second Y-axis support portion 352 come into contact with the outer circumferential surface of the shaft portion 222 of the Y-axis movable object holding portion 220 to be movable in at least the Y-axis direction.

In a state in which the Y-axis movable object 300 overlaps the X-axis movable object 200, the Y-axis friction engagement portion 340 is located between the first convex portion 211 and the second convex portion 212 provided in the X-axis movable object body portion 210. In addition, the Y-axis friction engagement portion 340 is located between the Y-axis drive shaft 232 of the Y-axis actuator 230 and the X-axis movable object body portion 210.

In addition, the Y-axis movable object body portion 310 is provided with a pressing member 341 of which one end portion is fixed on the third sidewall portion 311c rising from the Y-axis movable object body portion 310 and the other end portion comes into contact with the Y-axis drive shaft 232 of the Y-axis actuator 230. The pressing member 341 has elasticity. The other end portion of the pressing member 341 comes into contact with the Y-axis drive shaft 232, so that the pressing member 341 lifts the Y-axis movable object body portion 310 in a direction separated from the X-axis movable object body portion 210.

As a result, the V-shaped surface 340a of the Y-axis friction engagement portion 340 frictionally engages with an outer circumferential surface of the Y-axis drive shaft 232 of the Y-axis actuator 230. In addition, the outer circumferential surface of the Y-axis drive shaft 232 and the V-shaped surface 340a come into line contact with each other in two lines. Specifically, one surface configuring a V shape in the V-shaped surface 340a and the outer circumferential surface of the Y-axis drive shaft 232 come into line contact with each other and the other surface configuring the V shape in the V-shaped surface 340a and the outer circumferential surface of the Y-axis drive shaft 232 come into line contact with each other.

In a state in which the Y-axis friction engagement portion 340 frictionally engages with the Y-axis drive shaft 232 of the Y-axis actuator 230, the Y-axis piezoelectric element 231 expands and contracts in the Y-axis direction, so that the Y-axis movable object 300 is moved in the Y-axis direction.

As illustrated in FIG. 15, a length of the Y-axis direction in the Y-axis friction engagement portion 340 is shorter than a length of the predetermined gap between the first convex portion 211 and the second convex portion 212 provided in the X-axis movable object body portion 210. That is, a movement of the Y-axis direction in the Y-axis friction engagement portion 340 is regulated by the first convex portion 211 and the second convex portion 212. As such, the first convex portion 211 and the second convex portion 212 provided in the X-axis movable object body portion 210 function as a Y-axis stopper mechanism for regulating a movement range of the Y-axis direction in the Y-axis movable object 300.

The Y-axis movable object 300 is held to be movable in the Y-axis direction, in three places of the Y-axis friction engagement portion 340, the first Y-axis support portion 351, and the second Y-axis support portion 352, with respect to the X-axis movable object 200. The pressing members 341 and 353 lift the Y-axis movable object body portion 310, so that the Y-axis movable object body portion 310 floats from the X-axis movable object body portion 210.

As illustrated in FIG. 12, a carrier actuator 330 is provided on a surface of the Y-axis movable object body portion 310 at the side of the lens carrier 400. The carrier actuator 330 is held by the actuator holding portion 310b provided in the Y-axis movable object body portion 310. The carrier actuator 330 and the notch portion 312 of the Y-axis movable object 300 face each other with the optical axis L between the carrier actuator 330 and the notch portion 312.

The carrier actuator 330 is an actuator that configures a smooth impact drive mechanism. The carrier actuator 330 includes a prismatic Z-axis piezoelectric element 331, a Z-axis drive shaft 332, and a weight portion 333. The Z-axis piezoelectric element 331 is an element that can expand and contract in the direction of the optical axis L. The Z-axis piezoelectric element 331 has the same configuration as the configuration of the X-axis piezoelectric element 131 of the X-axis actuator 130. The expansion and the contraction of the Z-axis piezoelectric element 331 can be controlled by controlling a voltage applied to the Z-axis piezoelectric element 331.

The Z-axis drive shaft 332 is formed in a columnar shape and is disposed such that an axis line of a columnar shape extends along the direction of the optical axis L. The Z-axis drive shaft 332 is configured using a composite resin material including a fiber such as a carbon fiber, similar to the X-axis drive shaft 132. One end portion of the direction of the optical axis L in the Z-axis drive shaft 332 is fixed on one end portion of the direction of the optical axis L in the Z-axis piezoelectric element 331.

The weight portion 333 is fixed on the other end portion of the direction of the optical axis L in the Z-axis piezoelectric element 331. The weight portion 333 is designed to be heavier than the Z-axis drive shaft 332, similar to the weight portion 133. The weight portion 333 is fitted into the actuator holding portion 310b provided in the Y-axis movable object body portion 310 to be fixed, so that the carrier actuator 330 is held in the Y-axis movable object 300.

An adhesive such as an epoxy adhesive can be used for fixation of the Z-axis piezoelectric element 331 and the Z-axis drive shaft 332, fixation of the Z-axis piezoelectric element 331 and the weight portion 333, and fixation of the weight portion 333 and the actuator holding portion 310b.

Figure 16:
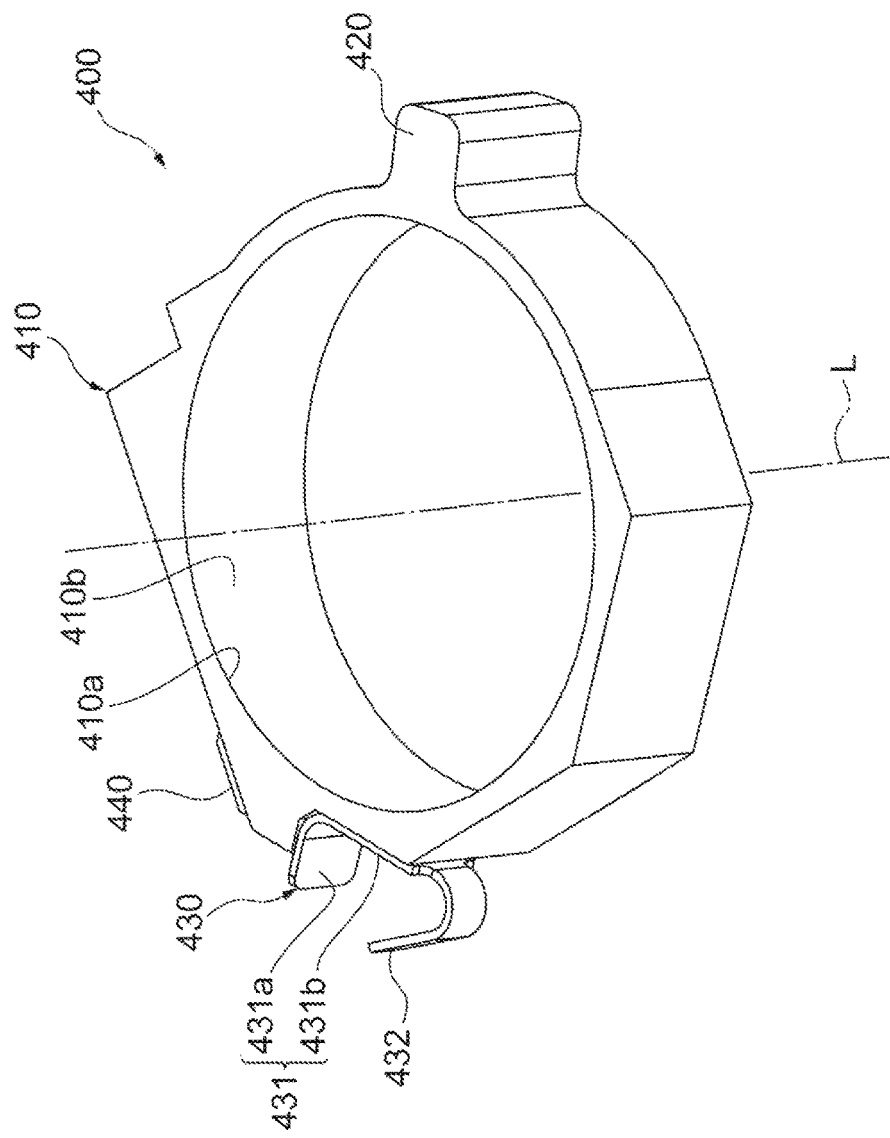
FIG. 16 is a perspective view illustrating a lens carrier.

Next, a configuration of the lens carrier 400 and a support configuration of the lens carrier 400 by the Y-axis movable object 300 will be described in detail. As illustrated in FIG. 16, the lens carrier 400 includes a carrier body portion 410, a locking convex portion 420, an engagement portion 430, and a carrier convex portion 440.

Figure 17:
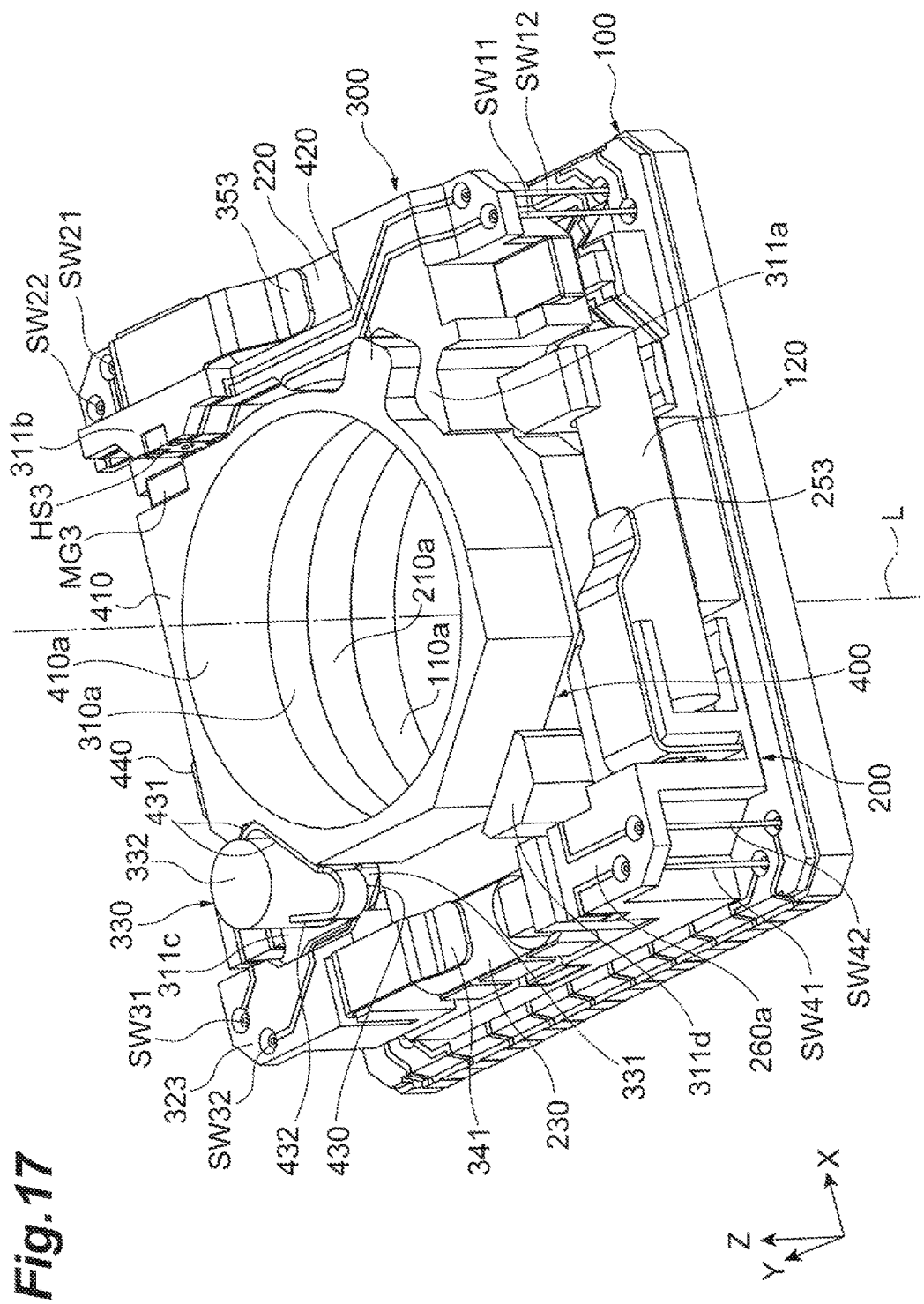
FIG. 17 is a perspective view when a state in which the base member, the X-axis movable object, the Y-axis movable object, and the lens carrier are combined is viewed from the side of the X-axis movable object holding portion.
Figure 18:
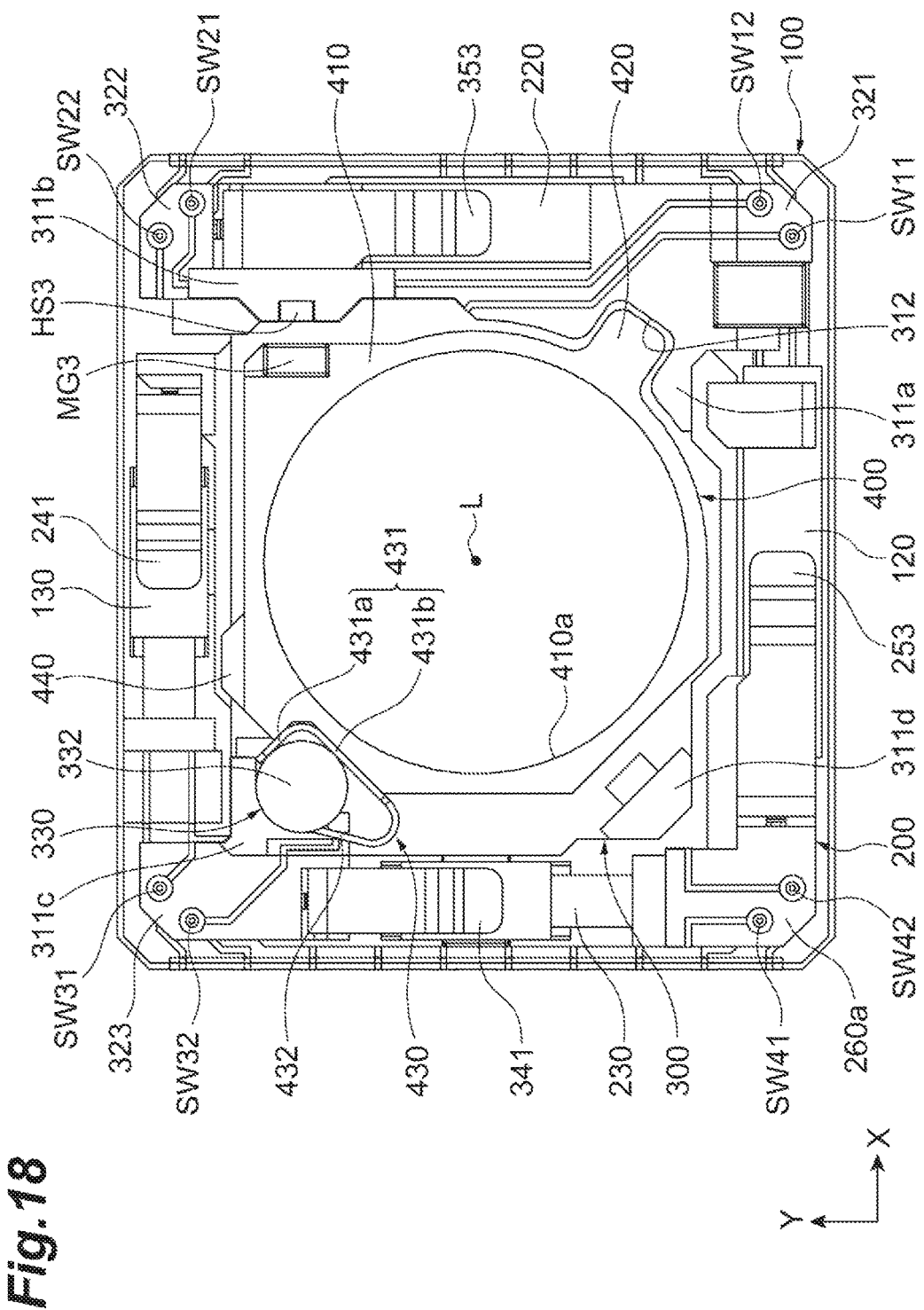
FIG. 18 is a plan view illustrating a state in which the base body portion, the X-axis movable object body portion, the Y-axis movable object, and the lens carrier are combined.

As illustrated in FIGS. 16 to 18, the lens carrier 400 is disposed to be surrounded by the first sidewall portion 311a, the second sidewall portion 311b, the third sidewall portion 311c, and the fourth sidewall portion 311d, on the Y-axis movable object body portion 310 of the Y-axis movable object 300. The carrier body portion 410 is provided with a circular opening portion 410a with the optical axis L as a center. The opening portion 410a provided in the carrier body portion 410 and the opening portion 310a provided in the Y-axis movable object body portion 310 have almost the same sizes. The lens 4 is attached to the opening portion 410a of the carrier body portion 410. That is, a wall surface of the opening portion 410a becomes a lens attachment portion 410b to attach the lens 4. The lens 4 may be a lens unit configured using a plurality of lenses and may be a single lens.

The locking convex portion 420 protrudes from the outer circumferential surface of the carrier body portion 410 along a direction orthogonal to the optical axis L. In addition, the locking convex portion 420 extends along the optical axis L on the outer circumferential surface of the carrier body portion 410. The locking convex portion 420 is fitted into the notch portion 312 of the Y-axis movable object 300. A shape and a dimension of the locking convex portion 420 are almost the same as the shape and the dimension of the notch portion 312. However, the notch portion 312 is slightly larger than the locking convex portion 420 and the locking convex portion 420 can be fitted into the notch portion 312. Rotation of the lens carrier 400 around the optical axis L is suppressed by fitting of the locking convex portion 420 of the lens carrier 400 and the notch portion 312 of the Y-axis movable object 300.

The engagement portion 430 is a member that engages with the Z-axis drive shaft 332 of the carrier actuator 330. The engagement portion 430 is a metallic member having elasticity and is attached to the outer circumferential surface of the carrier body portion 410. The engagement portion 430 and the locking convex portion 420 substantially face each other with the optical axis L between the engagement portion 430 and the locking convex portion 420.

The engagement portion 430 includes a Z-axis friction engagement portion 431 frictionally engaging with the Z-axis drive shaft 332 and a pressing member 432. The Z-axis friction engagement portion 431 is formed in an approximately V shape. In the Z-axis friction engagement portion 431, an inner surface (a first inner surface 431a and a second inner surface 431b) with the approximately V shape comes into contact with the outer circumferential surface of the Z-axis drive shaft 332. More specifically, the Z-axis friction engagement portion 431 (the first inner surface 431a and the second inner surface 431b) comes into contact with a portion of the outer circumferential surface of the Z-axis drive shaft 332 at the side of the optical axis L. The pressing member 432 and the Z-axis friction engagement portion 431 interpose the Z-axis drive shaft 332 between the pressing member 432 and the Z-axis friction engagement portion 431. The pressing member 432 has elasticity. The Z-axis friction engagement portion 431 is biased to the side of the Z-axis drive shaft 332 by the elasticity of the pressing member 432, so that the Z-axis friction engagement portion 431 frictionally engages with the Z-axis drive shaft 332.

In a state in which the Z-axis friction engagement portion 431 of the engagement portion 430 frictionally engages with the Z-axis drive shaft 332 of the carrier actuator 330, the Z-axis piezoelectric element 331 expands and contracts in the direction of the optical axis L, so that the lens carrier 400 is moved in the direction of the optical axis L.

The carrier convex portion 440 is provided on the outer circumferential surface of the carrier body portion 410 and protrudes from the outer circumferential surface of the carrier body portion 410 along a direction orthogonal to the optical axis L. The carrier convex portion 440 is provided in the vicinity of the engagement portion 430, on the outer circumferential surface of the carrier body portion 410.

Figure 19:
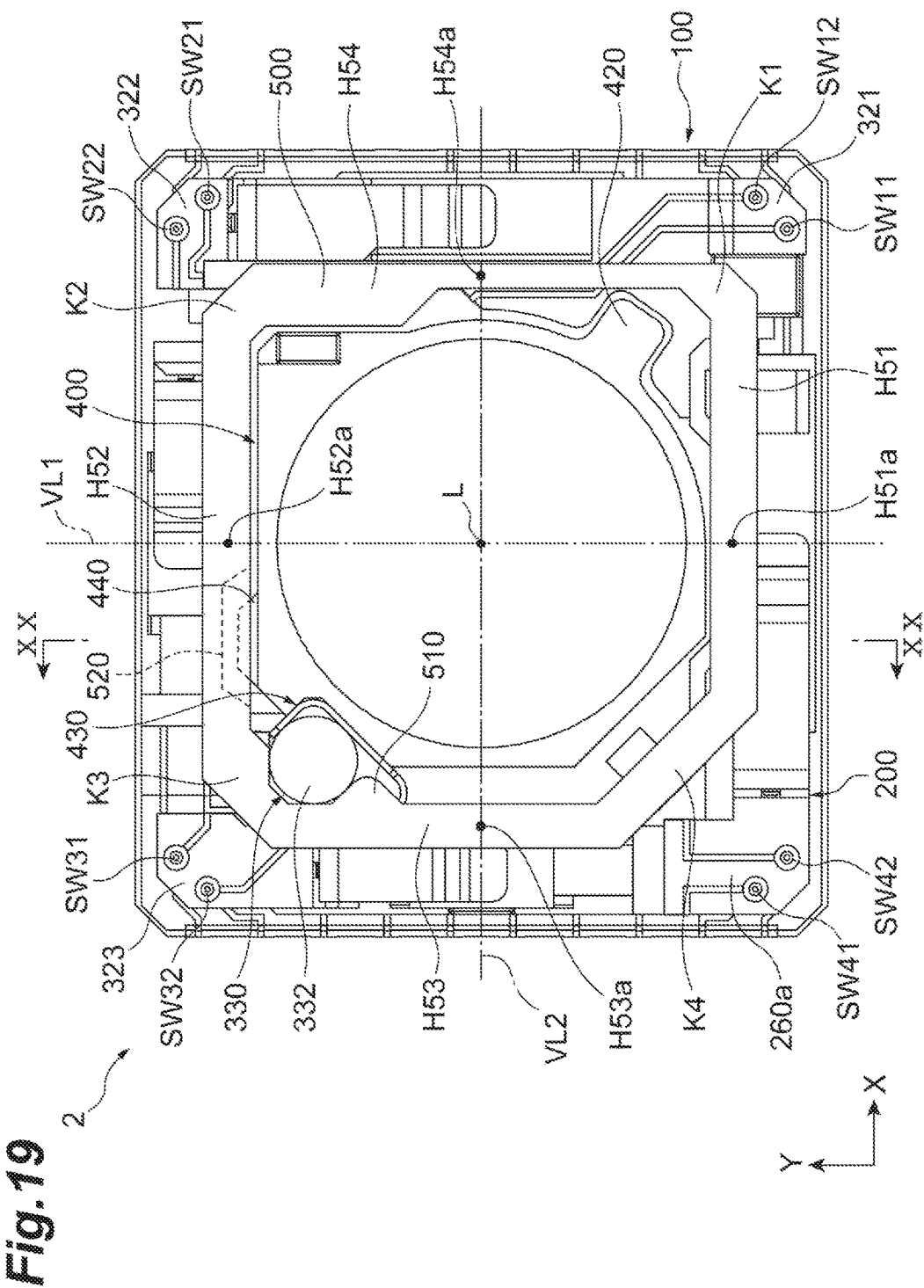
FIG. 19 is a plan view when the lens drive unit is viewed from the side of an auxiliary member.

As illustrated in FIG. 19, the auxiliary member 500 has a shape of an approximately rectangular frame surrounding the lens carrier 400, when viewed from the direction of the optical axis L. The auxiliary member 500 is attached to the Y-axis movable object 300.

For the convenience of description, four sides configuring an outer circumferential edge of the auxiliary member 500 when viewed from the direction of the optical axis L are called sides H51, H52, H53, and H54. As illustrated in FIGS. 19 and 15, the side H51 is a side located at the side of the side H31 of the Y-axis movable object 300 with respect to the optical axis L, when viewed from the direction of the optical axis L in a state in which the auxiliary member 500 overlaps the Y-axis movable object 300. Likewise, the side H52 is a side located at the side of the side H32 of the Y-axis movable object 300 with respect to the optical axis L. The side H53 is a side located at the side of the side H33 of the Y-axis movable object 300 with respect to the optical axis L. The side H54 is a side located at the side of the side H34 of the Y-axis movable object 300 with respect to the optical axis L.

In addition, a corner portion formed by connecting the sides H51 and H54 is called a corner portion K1. Likewise, a corner portion formed by connecting the sides H54 and H52 is called a corner portion K2. A corner portion formed by connecting the sides H52 and H53 is called a corner portion K3. A corner portion formed by connecting the sides H53 and H51 is called a corner portion K4.

The corner portion K1 of the auxiliary member 500 is supported (fixed) by the first sidewall portion 311a of the Y-axis movable object 300. The corner portion K2 is supported (fixed) by the second sidewall portion 311b of the Y-axis movable object 300. The corner portion K3 is supported (fixed) by the third sidewall portion 311c of the Y-axis movable object 300. The corner portion K4 is supported (fixed) by the fourth sidewall portion 311d of the Y-axis movable object 300.

The auxiliary member 500 supports the Z-axis drive shaft 332 of the carrier actuator 330 to be movable in the direction of the optical axis L. The auxiliary member 500 comes into contact with point contact with the outer circumferential surface of the Z-axis drive shaft 332 at two points or more and supports the carrier actuator 330. More specifically, the carrier actuator 330 is located in the corner portion K3 in the frame of the auxiliary member 500, when viewed from the direction of the optical axis L. An inner surface of the corner portion K3 comes into contact with the outer circumferential surface of the Z-axis drive shaft 332, so that the auxiliary member 500 supports the carrier actuator 330. The Z-axis drive shaft 332 is interposed by the inner surface of the corner portion K3 and the Z-axis friction engagement portion 431 of the engagement portion 430, when viewed from the direction of the optical axis L.

In this embodiment, a support convex portion 510 is provided in an inner portion of the side H53. The Z-axis drive shaft 332 is located between the support convex portion 510 and the side H52, when viewed from the direction of the optical axis L. At the side H53, the Z-axis drive shaft 332 is supported in two places of a portion closer to the side H52 than the support convex portion 510 and a portion of the support convex portion 510 facing the side H52. In addition, at the side H52, the Z-axis drive shaft 332 is supported in one place of a portion near an end portion of the side to which the side H53 is connected. As a result, the Z-axis drive shaft 332 is supported in a total of three places in the corner portion K3.

Figure 20:
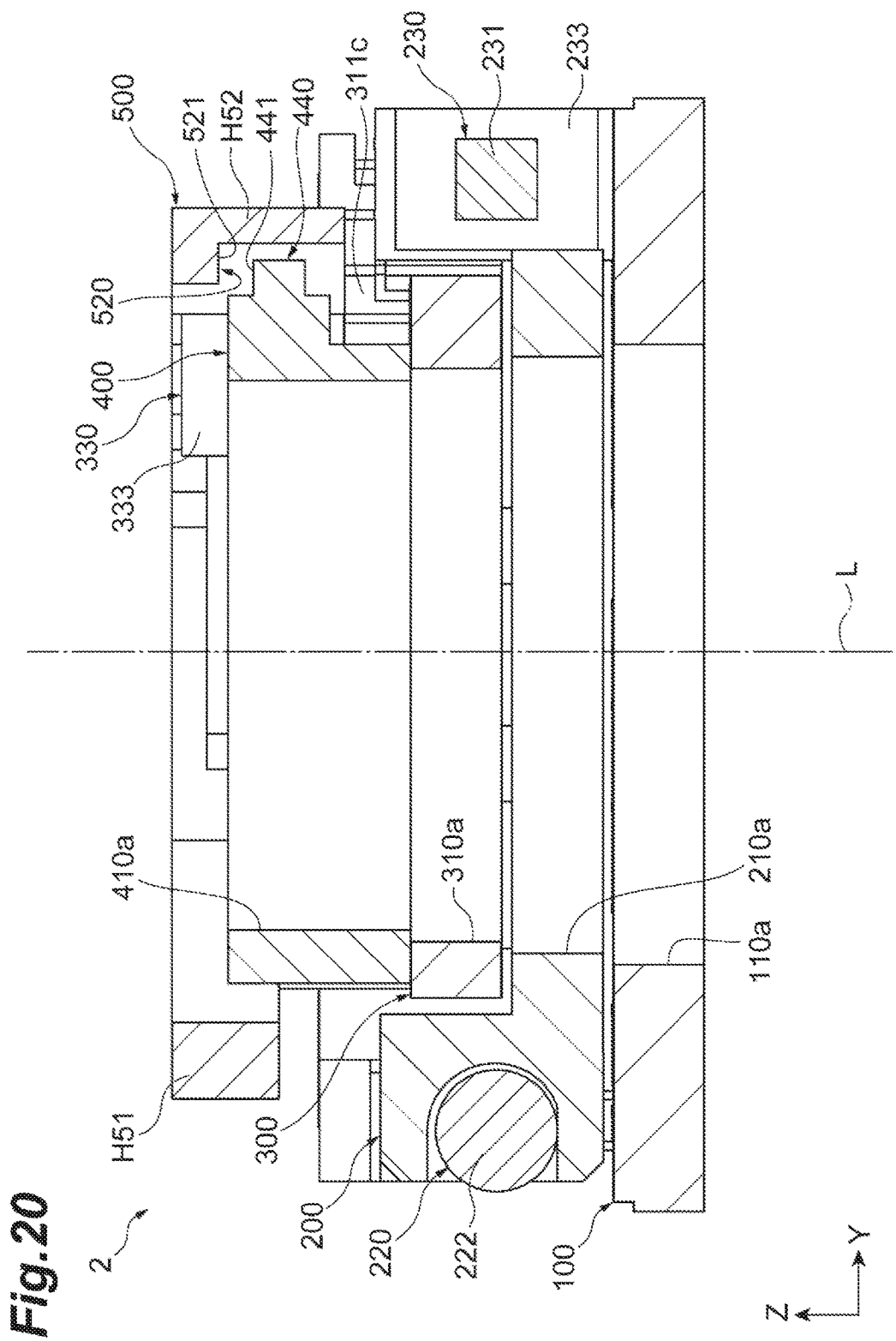
FIG. 20 is a cross-sectional view taken along the line XX-XX of FIG. 19.

As illustrated in FIG. 20, a stepped portion 520 is provided inside the side H52 of the auxiliary member 500. The stepped portion 520 is formed by projecting an end portion of the side H52 opposite to the side of the Y-axis movable object body portion 310 to the side of the optical axis L. A surface of the stepped portion 520 facing the side of the Y-axis movable object 300 is defined as an auxiliary member side contact portion 521. The auxiliary member side contact portion 521 overlaps a part of the carrier convex portion 440, when viewed from the direction of the optical axis L. A surface of the carrier convex portion 440 facing the auxiliary member side contact portion 521 is defined as a carrier side contact portion 441. That is, the carrier side contact portion 441 is a surface opposite to the surface of the carrier convex portion 440 at the side of the Y-axis movable object body portion 310.

As such, the auxiliary member side contact portion 521 of the auxiliary member 500 and the carrier side contact portion 441 of the lens carrier 400 face each other in the direction of the optical axis L. As a result, when the lens carrier 400 moves to a position separated by a predetermined distance in the direction of the optical axis L with respect to the Y-axis movable object 300, the auxiliary member side contact portion 521 and the carrier side contact portion 441 come in contact with each other and a movement of the direction of the optical axis L in the lens carrier 400 is restricted. As such, the auxiliary member side contact portion 521 and the carrier side contact portion 441 function as a carrier stopper mechanism for restricting the movement of the direction of the optical axis L in the lens carrier 400.

As illustrated in FIG. 19, the auxiliary member side contact portion 521 (stepped portion 520) and the carrier side contact portion 441 (carrier convex portion 440) configuring the carrier stopper mechanism are provided in the corner portion K3 in which the carrier actuator 330 is disposed, among the corner portions of the auxiliary member 500.

Here, the provision of the auxiliary member side contact portion 521 or the like in the corner portion K3 means that the auxiliary member side contact portion 521 or the like is provided closer to the corner portion K3 than the other corner portions. The provision of the auxiliary member side contact portion 521 or the like in the corner portion K3 means a region around a connection portion of the sides H52 and H53, not a connection point of the sides H52 and H53.

For example, a center position in an extension direction of the side H51 is defined as a center point H51a and a center position in an extension direction of the side H52 is defined as a center point H52a. A center position in an extension direction of the side H53 is defined as a center point H53a and a center position in an extension direction of the side H54 is defined as a center point H54a. A straight line passing the center points H51a and H52a when viewed from the direction of the optical axis L is defined as a virtual line VL1. Likewise, a straight line passing the center points H53a and H54a is defined as a virtual line VL2. The provision of the auxiliary member side contact portion 521 or the like in the corner portion K3 includes provision of the auxiliary member side contact portion 521 or the like in a region separated by the virtual line VL1 towards the side H53 and by the virtual line VL2 towards the side H52, around the auxiliary member 500, when viewed from the direction of the optical axis L.

Next, electric wiring lines connected to each actuator, sensors detecting a position of the X-axis movable object 200 or the like, and electric wiring lines connected to each sensor will be described. First, electric wiring lines and sensors provided in the base member 100 will be described. As illustrated in FIG. 4, a hall sensor HS1, a hall sensor HS2, and electric wiring lines W101 to W118 are provided on the surface of the base body portion 110 at the side which the X-axis movable object 200 overlaps.

The hall sensor HS1 functions as a position sensor that detects a position of the X-axis movable object 200 moving in the X-axis direction with respect to the base member 100. The hall sensor HS1 is provided in the same side with the side H13 against the opening portion 110a in the base body portion 110. One end side of the electric wiring lines W101 to W104 is connected to the hall sensor HS1. The other end sides of the electric wiring lines W101 to W104 extend to the side H13 of the base body portion 110.

One end side of the electric wiring lines W105 and W106 is connected to the X-axis piezoelectric element 131 of the X-axis actuator 130 and the other end sides thereof extend to the side H13 of the base body portion 110. The electric wiring lines W105 and W106 supply power to the X-axis piezoelectric element 131.

Concave connection points P31 and P32 are provided in the corner portion of the base body portion 110 in which the sides H13 and H12 are connected. One end side of the electric wiring lines W107 and W108 extends to the connection points P31 and P32 and the other end sides thereof extend to the side H13 of the base body portion 110. Concave connection points P41 and P42 are provided in the corner portion of the base body portion 110 in which the sides H13 and H11 are connected. One end side of the electric wiring lines W109 and W110 extends to the connection points P41 and P42 and the other end sides thereof extend to the side H13 of the base body portion 110.

The hall sensor HS2 functions as a position sensor that detects a position of the Y-axis movable object 300 moving in the Y-axis direction with respect to the base member 100. The hall sensor HS2 is provided at a position near the corner portion of the base body portion 110 in which the sides H11 and H14 are connected. The hall sensor HS2 is provided on the raised portion 110c to be raised to the side of the Y-axis movable object 300 in the base body portion 110. One end side of the electric wiring lines W111 to W114 is connected to the hall sensor HS2. The other end sides of the electric wiring lines W111 to W114 extend to the side H14 of the base body portion 110.

As illustrated in FIG. 6, the X-axis movable object body portion 210 of the X-axis movable object 200 has a shape to be kept away from the hall sensor HS2 and the raised portion 110c when viewed from the direction of the optical axis L, not to interfere with the hall sensor HS2 and the raised portion 110c.

As illustrated in FIG. 4, concave connection points P11 and P12 are provided in the corner portion of the base body portion 110 in which the sides H11 and H14 are connected. One end side of the electric wiring lines W115 and W116 extends to the connection points P11 and P12 and the other end sides thereof extend to the side H14 of the base body portion 110. Concave connection points P21 and P22 are provided in the corner portion of the base body portion 110 in which the sides H12 and H14 are connected. One end side of the electric wiring lines W117 and W118 extends to the connection points P21 and P22 and the other end sides thereof extend to the side H14 of the base body portion 110.

An edge portion of an opening of the connection point P11 is formed in an approximately tapered shape in which a diameter decreases toward the side of a concave bottom portion. Similar to the edge portion of the opening of the connection point P11, edge portions of openings of the connection points P12, P21, P22, P31, P32, P41, and P42 are formed in an approximately tapered shape.

Next, electric wiring lines or the like provided in the X-axis movable object 200 will be described. As illustrated in FIG. 6, a magnet MG1 and electric wiring lines W201 and W202 are provided in the X-axis movable object 200. The magnet MG1 is provided in a concave portion provided at a position between the first convex portion 211 and the second convex portion 212, on the surface of the X-axis movable object body portion 210 at the side which the Y-axis movable object 300 overlaps. In addition, positions of the hall sensor HS1 provided in the base member 100 and the magnet MG1 overlap each other in the direction of the optical axis L. The hall sensor HS1 detects the position of the X-axis movable object 200 with respect to the base member 100, on the basis of a change of a magnetic field of the magnet MG1 moving with the X-axis movable object body portion 210. The X-axis actuator 130 is feedback-controlled on the basis of a detection result of the hall sensor HS1.

Connection points Q41 and Q42 are provided on a surface of the projection portion 260a of the rising portion 260 at the side of the Y-axis movable object 300. The connection points Q41 and Q42 have a shape of a hole that penetrates the projection portion 260a in the direction of the optical axis L. Edge portions of openings of the connection points Q41 and Q42 at the side of the Y-axis movable object 300 are formed in an approximately tapered shape in which a diameter decreases toward the openings of the side of the base member 100.

In a state in which the X-axis movable object 200 is located at an X-axis reference position with respect to the base member 100, positions of the connection points Q41 and Q42 are matched with positions of the connection points P41 and P42 provided in the base body portion 110, respectively, when viewed from the direction of the optical axis L. In addition, the X-axis reference position is a position (initial position) before the X-axis movable object 200 is moved in the X-axis direction with respect to the base member 100. For example, the X-axis reference position is a position of the X-axis movable object 200 when the X-axis friction engagement portion 240 of the X-axis movable object 200 is at an intermediate position of the first convex portion 111 and the second convex portion 112 of the base member 100.

One end side of the electric wiring lines W201 and W202 is connected to the Y-axis piezoelectric element 231 of the Y-axis actuator 230 and the other end sides thereof extend to the connection points Q41 and Q42 provided in the projection portion 260a. The electric wiring lines W201 and W202 supply power to the Y-axis piezoelectric element 231.

The electric wiring line W201 provided in the rising portion 260 of the X-axis movable object 200 and the electric wiring line W109 provided in the base member 100 are connected by a conductive suspension wire (second suspension wire) SW41. The electric wiring line W202 provided in the rising portion 260 and the electric wiring line W110 provided in the base member 100 are connected by a conductive suspension wire (second suspension wire) SW42.

Specifically, one end of the suspension wire SW41 is inserted into the connection point P41 and the other end thereof passes through the connection point Q41. The suspension wire SW41 and the electric wiring line W109 are connected to each other by solder or conductive paste at the connection point P41. In addition, the edge portion of the opening of the connection point P41 is formed in a tapered shape, so that it is easy to cause the solder or the conductive paste to flow into the connection point P41, and the suspension wire SW41 and the electric wiring line W109 can be easily connected. In addition, the suspension wire SW41 can be easily mounted. Because an edge portion of an opening of a connection point is formed in a tapered shape even in connection of other connection point such as the connection point P42 and other suspension wire such as the suspension wire SW42, the same effect as the case of the connection point P41 is achieved. The suspension wire SW41 and the electric wiring line W201 are connected to each other by the solder or the conductive paste at the connection point Q41.

One end of the suspension wire SW42 is inserted into the connection point P42 and the other end thereof passes through the connection point Q42. The suspension wire SW42 and the electric wiring line W110 are connected to each other by the solder or the conductive paste at the connection point P42. The suspension wire SW42 and the electric wiring line W202 are connected to each other by the solder or the conductive paste at the connection point Q42.

Here, as illustrated in FIG. 12, the projection portion 260a is located in the same side with the lens carrier 400 against the surface of the Y-axis movable object body portion 310 at the side of the X-axis movable object 200, in the direction of the optical axis L. That is, connection positions of the electric wiring lines W201 and W202 provided in the projection portion 260a and the suspension wires SW41 and SW42 are located in the same side with the lens carrier 400 against the surface of the Y-axis movable object body portion 310 at the side of the X-axis movable object 200, in the direction of the optical axis L. The rising portion 260 is provided in the X-axis movable object 200 and one end of the suspension wires SW41 and SW42 is connected, so that the connection positions of the electric wiring lines W201 and W202 of the side of the X-axis movable object 200 and the suspension wires SW41 and SW42 can be separated from the base member 100 (set to a far position).

Next, electric wiring lines or the like provided in the Y-axis movable object 300 will be described. As illustrated in FIGS. 2 and 12, a hall sensor HS3, a magnet MG2, and electric wiring lines W301 to W306 are provided in the Y-axis movable object 300. The magnet MG2 is provided in the corner portion of the Y-axis movable object body portion 310 in which the first sidewall portion 311a rises. In addition, positions of the hall sensor HS2 provided in the base member 100 and the magnet MG2 overlap each other in the direction of the optical axis L. The hall sensor HS2 detects a position of the Y-axis movable object 300 with respect to the base member 100, on the basis of a change of a magnetic field of the magnet MG2 moving with the Y-axis movable object body portion 310. The Y-axis actuator 230 is feedback-controlled on the basis of a detection result of the hall sensor HS2.

Connection points Q11 and Q12 are provided on a surface of the first wiring line connection portion 321 at the side of the auxiliary member 500. The connection points Q11 and Q12 have a shape of a hole that penetrates the first wiring line connection portion 321 in the direction of the optical axis L. Edge portions of openings of the connection points Q11 and Q12 at the side of the auxiliary member 500 are formed in an approximately tapered shape in which a diameter decreases toward the openings of the side of the base member 100.

Connection points Q21 and Q22 are provided on a surface of the second wiring line connection portion 322 at the side of the auxiliary member 500. The connection points Q21 and Q22 have a shape of a hole that penetrates the second wiring line connection portion 322 in the direction of the optical axis L. Edge portions of openings of the connection points Q21 and Q22 at the side of the auxiliary member 500 are formed in an approximately tapered shape in which a diameter decreases toward the openings of the side of the base member 100.

Connection points Q31 and Q32 are provided on a surface of the third wiring line connection portion 323 at the side of the auxiliary member 500. The connection points Q31 and Q32 have a shape of a hole that penetrates the third wiring line connection portion 323 in the direction of the optical axis L. Edge portions of openings of the connection points Q31 and Q32 at the side of the auxiliary member 500 are formed in an approximately tapered shape in which a diameter decreases toward the openings of the side of the base member 100.

In a state in which the Y-axis movable object 300 is located at a Y-axis reference position with respect to the base member 100 and the X-axis movable object 200 is located at the X-axis reference position with respect to the base member 100, positions of the connection points Q11 and Q12 are matched with positions of the connection points P11 and P12 provided in the base body portion 110, respectively, when viewed from the direction of the optical axis L. Likewise, positions of the connection points Q21 and Q22 are matched with positions of the connection points P21 and P22 provided in the base body portion 110, respectively. Positions of the connection points Q31 and Q32 are matched with positions of the connection points P31 and P32 provided in the base body portion 110, respectively.

In addition, the Y-axis reference position is a position (initial position) before the X-axis movable object 200 is located at the X-axis reference position and the Y-axis movable object 300 is moved in the Y-axis direction with respect to the base member 100. For example, the Y-axis reference position is a position of the Y-axis movable object 300 when the X-axis movable object 200 is located at the X-axis reference position and the Y-axis friction engagement portion 340 of the Y-axis movable object 300 is at an intermediate position of the first convex portion 211 and the second convex portion 212 of the X-axis movable object 200.

The hall sensor HS3 functions as a position sensor that detects a position of the lens carrier 400 moving in the direction of the optical axis L with respect to the Y-axis movable object 300. The hall sensor HS3 is provided on the surface of the second sidewall portion 311b at the side of the opening portion 310a. One end side of the electric wiring lines W301 to W304 is connected to the hall sensor HS3. The other end sides of the electric wiring lines W301 and W302 extend to the connection points Q11 and Q12 provided in the first wiring line connection portion 321. The other end sides of the electric wiring lines W303 and W304 extend to the connection points Q21 and Q22 provided in the second wiring line connection portion 322 (refer to FIG. 2).

One end side of the electric wiring lines W305 and W306 is connected to the Z-axis piezoelectric element 331 of the carrier actuator 330 and the other end sides thereof extend to the connection points Q31 and Q32 provided in the third wiring line connection portion 323. The electric wiring lines W305 and W306 supply power to the Z-axis piezoelectric element 331.

The electric wiring line W301 provided in the first wiring line connection portion 321 of the Y-axis movable object 300 and the electric wiring line W115 provided in the base member 100 are connected by a conductive suspension wire (fourth suspension wire) SW11. The electric wiring line W302 provided in the first wiring line connection portion 321 and the electric wiring line W116 provided in the base member 100 are connected by a conductive suspension wire (fourth suspension wire) SW12.

Specifically, one end of the suspension wire SW11 is inserted into the connection point P11 and the other end thereof passes through the connection point Q11. The suspension wire SW11 and the electric wiring line W115 are connected to each other by the solder or the conductive paste at the connection point P11. The suspension wire SW11 and the electric wiring line W301 are connected to each other by the solder or the conductive paste at the connection point Q11. In addition, one end of the suspension wire SW12 is inserted into the connection point P12 and the other end thereof passes through the connection point Q12. The suspension wire SW12 and the electric wiring line W116 are connected to each other by the solder or the conductive paste at the connection point P12. The suspension wire SW12 and the electric wiring line W302 are connected to each other by the solder or the conductive paste at the connection point Q12.

The electric wiring line W303 provided in the second wiring line connection portion 322 of the Y-axis movable object 300 and the electric wiring line W117 provided in the base member 100 are connected by a conductive suspension wire (third suspension wire) SW21 (refer to FIG. 2). The electric wiring line W304 provided in the second wiring line connection portion 322 and the electric wiring line W118 provided in the base member 100 are connected by a conductive suspension wire (third suspension wire) SW22.

Specifically, one end of the suspension wire SW21 is inserted into the connection point P21 and the other end thereof passes through the connection point Q21. The suspension wire SW21 and the electric wiring line W117 are connected to each other by the solder or the conductive paste at the connection point P21. The suspension wire SW21 and the electric wiring line W303 are connected to each other by the solder or the conductive paste at the connection point Q21. In addition, one end of the suspension wire SW22 is inserted into the connection point P22 and the other end thereof passes through the connection point Q22. The suspension wire SW22 and the electric wiring line W118 are connected to each other by the solder or the conductive paste at the connection point P22. The suspension wire SW22 and the electric wiring line W304 are connected to each other by the solder or the conductive paste at the connection point Q22.

The electric wiring line W305 provided in the third wiring line connection portion 323 of the Y-axis movable object 300 and the electric wiring line W107 provided in the base member 100 are connected by a conductive suspension wire (first suspension wire) SW31 (refer to FIG. 2). The electric wiring line W306 provided in the third wiring line connection portion 323 and the electric wiring line W108 provided in the base member 100 are connected by a conductive suspension wire (first suspension wire) SW32.

Specifically, one end of the suspension wire SW31 is inserted into the connection point P31 and the other end thereof passes through the connection point Q31. The suspension wire SW31 and the electric wiring line W107 are connected to each other by the solder or the conductive paste at the connection point P31. The suspension wire SW31 and the electric wiring line W305 are connected to each other by the solder or the conductive paste at the connection point Q31. In addition, one end of the suspension wire SW32 is inserted into the connection point P32 and the other end thereof passes through the connection point Q32. The suspension wire SW32 and the electric wiring line W108 are connected to each other by the solder or the conductive paste at the connection point P32. The suspension wire SW32 and the electric wiring line W306 are connected to each other by the solder or the conductive paste at the connection point Q32.

In connection positions of the electric wiring lines W301 to W306 provided in the Y-axis movable object 300 and the suspension wires SW11, SW12, SW21, SW22, SW31, and SW32, height positions along the direction of the optical axis L from the base member 100 are almost the same. In addition, in a connection position of the electric wiring line W301 provided in the Y-axis movable object 300 and the suspension wire SW11 and a connection position of the electric wiring line W201 provided in the X-axis movable object 200 and the suspension wire SW41, height positions along the direction of the optical axis L from the base member 100 are almost the same. Here, "the heights are almost the same" includes the case in which the heights are completely matched and the case in which there is a slight difference in a range for the purpose of aligning the heights. As a result, lengths of the suspension wires SW11, SW12, SW21, SW22, SW31, SW32, SW41, and SW42 are almost the same.

As illustrated in FIG. 4, each of the suspension wires SW11 and SW12, the suspension wires SW21 and SW22, the suspension wires SW31 and SW32, and the suspension wires SW41 and SW42 is configured as a set. The individual sets of suspension wires are located in the four corner portions of the base member 100, respectively.

As illustrated in FIG. 12, the suspension wires SW41 and SW42 are connected to the electric wiring lines W201 and W202 provided in the projection portion 260a projecting to the outside in the rising portion 260. As such, the projection portion 260a is provided, so that, when the X-axis movable object 200 moves in the X-axis direction with respect to the base member 100, the suspension wires SW41 and SW42 can be prevented from coming into contact with a base end portion of the rising portion 260.

In addition, the suspension wires SW11 and SW12 are connected to the electric wiring lines W301 and W302 provided in the first wiring line connection portion 321 projecting from the first sidewall portion 311a to the outside. As such, the first wiring line connection portion 321 is provided, so that, when the Y-axis movable object 300 moves in the X-axis direction and the Y-axis direction with respect to the base member 100, the suspension wires SW11 and SW12 can be prevented from coming into contact with a base end portion of the first sidewall portion 311a. Likewise, for the second wiring line connection portion 322 and the third wiring line connection portion 323, the suspension wires SW21 and SW22 can be prevented from coming into contact with a base end portion of the second sidewall portion 311b and the suspension wires SW31 and SW32 can be prevented from coming into contact with a base end portion of the third sidewall portion 311c.

Next, a magnet MG3 provided in the lens carrier 400 will be described. As illustrated in FIG. 18, the magnet MG3 is provided at a position facing the hall sensor HS3 in the carrier body portion 410. The hall sensor HS3 detects a position of the lens carrier 400 for the Y-axis movable object 300, on the basis of a change of a magnetic field of the magnet MG3 moving with the carrier body portion 410. The carrier actuator 330 is feedback-controlled on the basis of a detection result of the hall sensor HS3.

Next, a relation of a holding position of the X-axis movable object 200 by the base member 100 and a gravity center position of each portion will be described. As illustrated in FIG. 10, a portion in which the X-axis friction engagement portion 240 comes into contact with the X-axis drive shaft 132 is defined as a contact portion T1. A portion in which the raised portion 251c of the first X-axis support portion 251 comes into contact with the shaft portion 122 of the X-axis movable object holding portion 120 is defined as a contact portion T2. A portion in which the raised portion 252c of the second X-axis support portion 252 comes into contact with the shaft portion 122 of the X-axis movable object holding portion 120 is defined as a contact portion T3. A triangle with the contact portions T1 to T3 as vertexes is defined as a first triangle S1. A first gravity center to be a gravity center obtained by combining a gravity center of the X-axis movable object 200, a gravity center of the Y-axis movable object 300, a gravity center of the lens carrier 400, and a gravity center of the auxiliary member 500 is located at an inner side of the first triangle S1, when viewed from the direction of the optical axis L. In addition, the first gravity center is preferably close to a center position (gravity center position) of the first triangle S1.

Next, a relation of a holding position of the Y-axis movable object 300 by the X-axis movable object 200 and a gravity center position of each portion will be described. As illustrated in FIG. 15, a portion in which the Y-axis friction engagement portion 340 comes into contact with the Y-axis drive shaft 232 is defined as a contact portion T4. A portion in which the raised portion 351c of the first Y-axis support portion 351 comes into contact with the shaft portion 222 of the Y-axis movable object holding portion 220 is defined as a contact portion T5. A portion in which the raised portion 352c of the second Y-axis support portion 352 comes into contact with the shaft portion 222 of the Y-axis movable object holding portion 220 is defined as a contact portion T6. A triangle with the contact portions T4 to T6 as vertexes is defined as a second triangle S2. A second gravity center to be a gravity center obtained by combining a gravity center of the Y-axis movable object 300, a gravity center of the lens carrier 400, and a gravity center of the auxiliary member 500 is located at an inner side of the second triangle S2, when viewed from the direction of the optical axis L. In addition, the second gravity center is preferably close to a center position (gravity center position) of the second triangle S2.

The first convex portion 111 and the second convex portion 112 functioning as the X-axis stopper mechanism and provided in the base body portion 110 and the first convex portion 211 and the second convex portion 212 functioning as the Y-axis stopper mechanism and provided in the X-axis movable object body portion 210 restrict movement ranges of the X-axis movable object 200 and the Y-axis movable object 300, such that a first gravity center is located at the inner side of the first triangle S1 and a second gravity center is located at the inner side of the second triangle S2. As such, the movement ranges of the X-axis movable object 200 and the Y-axis movable object 300 are restricted by the X-axis stopper mechanism and the Y-axis stopper mechanism, so that a state in which the first gravity center is located at the inner side of the first triangle S1 and the second gravity center is located at the inner side of the second triangle S2 is maintained.

Here, the contact portions T1 to T6 will be described. As for the contact portions, when two members come into point contact with each other, like the contact portions T2, T3, T5, and T6, a point contact position is defined as the contact portion. In addition, when two members come into line contact with each other in two lines, like the contact portions T1 and T4, a center position (gravity center position) of a region interposed by two contact lines coming into line contact with each other is defined as the contact portion. Specifically, as illustrated in FIG. 10, the V-shaped surface 240a of the X-axis friction engagement portion 240 and the X-axis drive shaft 132 come into line contact with each other in two contact lines TL (shown by virtual lines (two-dot chain lines) in FIG. 10). A region interposed by the two contact lines TL when viewed from the direction of the optical axis L is defined as a region R (hatched to clarify the region). The contact portion T1 of the X-axis friction engagement portion 240 and the X-axis drive shaft 132 becomes a center position (gravity center position) of the region R. In addition, when two members come into surface contact with each other, a center position (gravity center position) of a surface contact region when viewed from the direction of the optical axis L is defined as the contact portion.

This embodiment is configured as described above. In the lens drive device 1, the X-axis movable object holding portion 120 holds the X-axis movable object 200 to be movable in the X-axis direction. As a result, when the X-axis movable object 200 is moved by the X-axis actuator 130, the X-axis movable object 200 can be stably moved in the X-axis direction by suppressing looseness. In addition, the X-axis movable object holding portion 120 is provided at the position facing the X-axis actuator 130 with the optical axis L between the X-axis movable object holding portion 120 and the X-axis actuator 130 in the base member 100, so that the X-axis movable object holding portion 120 can hold the X-axis movable object 200 with the gravity center of the lens 4 between the X-axis movable object holding portion 120 and the X-axis actuator 130. As a result, the lens drive device 1 can move the X-axis movable object 200 in the X-axis direction more stably by the X-axis actuator 130 and the X-axis movable object holding portion 120.

Likewise, for the Y-axis movable object 300, the lens drive device 1 includes the Y-axis movable object holding portion 220. Therefore, when the Y-axis movable object 300 is moved, the Y-axis movable object 300 can be stably moved in the Y-axis direction by suppressing the looseness. In addition, the Y-axis movable object holding portion 220 is provided at the position facing the Y-axis actuator 230 with the optical axis L between the Y-axis movable object holding portion 220 and the Y-axis actuator 230 in the X-axis movable object 200, so that the Y-axis movable object holding portion 220 can hold the Y-axis movable object 300 with the gravity center of the lens 4 between the Y-axis movable object holding portion 220 and the Y-axis actuator 230. As a result, the lens drive device 1 can move the Y-axis movable object 300 in the Y-axis direction more stably by the Y-axis actuator 230 and the Y-axis movable object holding portion 220.

Because the carrier actuator 330 is supported by the auxiliary member 500 attached to the Y-axis movable object 300, the inclination of the carrier actuator 330 can be suppressed. As a result, when the lens carrier 400 is moved, the lens drive device 1 can stably move the lens carrier 400 in the direction of the optical axis L.

Because the movement of the lens carrier 400 is restricted by the carrier stopper mechanism (the stepped portion 520 and the carrier convex portion 440), the lens carrier 400 can be prevented from moving to an unintended position and the lens carrier 400 can be prevented from coming into contact with other member unintentionally and being inclined.

As described above, the lens drive device 1 can stably move the X-axis movable object 200 moving in the X-axis direction, the Y-axis movable object 300 moving in the Y-axis direction, and the lens carrier 400 moving in the direction of the optical axis L.

The auxiliary member 500 comes into contact with point contact with the outer circumferential surface of the Z-axis drive shaft 332 at two points or more and supports the carrier actuator 330. In this case, the auxiliary member 500 can stably support the Z-axis drive shaft 332.

The carrier side contact portion 441 of the carrier convex portion 440 provided in the lens carrier 400 and the auxiliary member side contact portion 521 of the stepped portion 520 provided in the auxiliary member 500 come into contact with each other, when the lens carrier 400 moves to a position separated by a predetermined distance in the direction of the optical axis L with respect to the Y-axis movable object 300. In this case, the lens drive device 1 can easily realize the carrier stopper mechanism for restricting the movement of the lens carrier 400, by causing the carrier side contact portion 441 of the lens carrier 400 to come into contact with the auxiliary member side contact portion 521 of the auxiliary member 500.

The carrier convex portion 440 that includes the carrier side contact portion 441 configuring the carrier stopper mechanism protrudes in the direction orthogonal to the direction of the optical axis L, from the outer circumferential surface of the carrier body portion 410. The movement of the lens carrier 400 is restricted by causing the carrier side contact portion 441 of the carrier convex portion 440 to come into contact with the auxiliary member side contact portion 521 of the auxiliary member 500. As a result, the lens drive device 1 can realize the carrier stopper mechanism while suppressing the thickness of the direction of the optical axis L from increasing.

The carrier stopper mechanism (the carrier convex portion 440 and the stepped portion 520) is provided in the corner portion K3 in which the carrier actuator 330 is disposed, among the corner portions of the auxiliary member 500. In this case, even though the drive force is input from the carrier actuator 330 to the Z-axis friction engagement portion 431 after the movement of the lens carrier 400 is restricted by the carrier stopper mechanism, the drive force input from the carrier actuator 330 is received by the carrier stopper mechanism provided in the same corner portion K3 as the carrier actuator 330. As a result, even though the drive force is input from the carrier actuator 330 to the Z-axis friction engagement portion 431 after the movement of the lens carrier 400 is restricted by the carrier stopper mechanism, the inclination of the lens carrier 400 can be suppressed and the lens carrier 400 can be maintained in a stable state.

(Modification)

Figure 21:
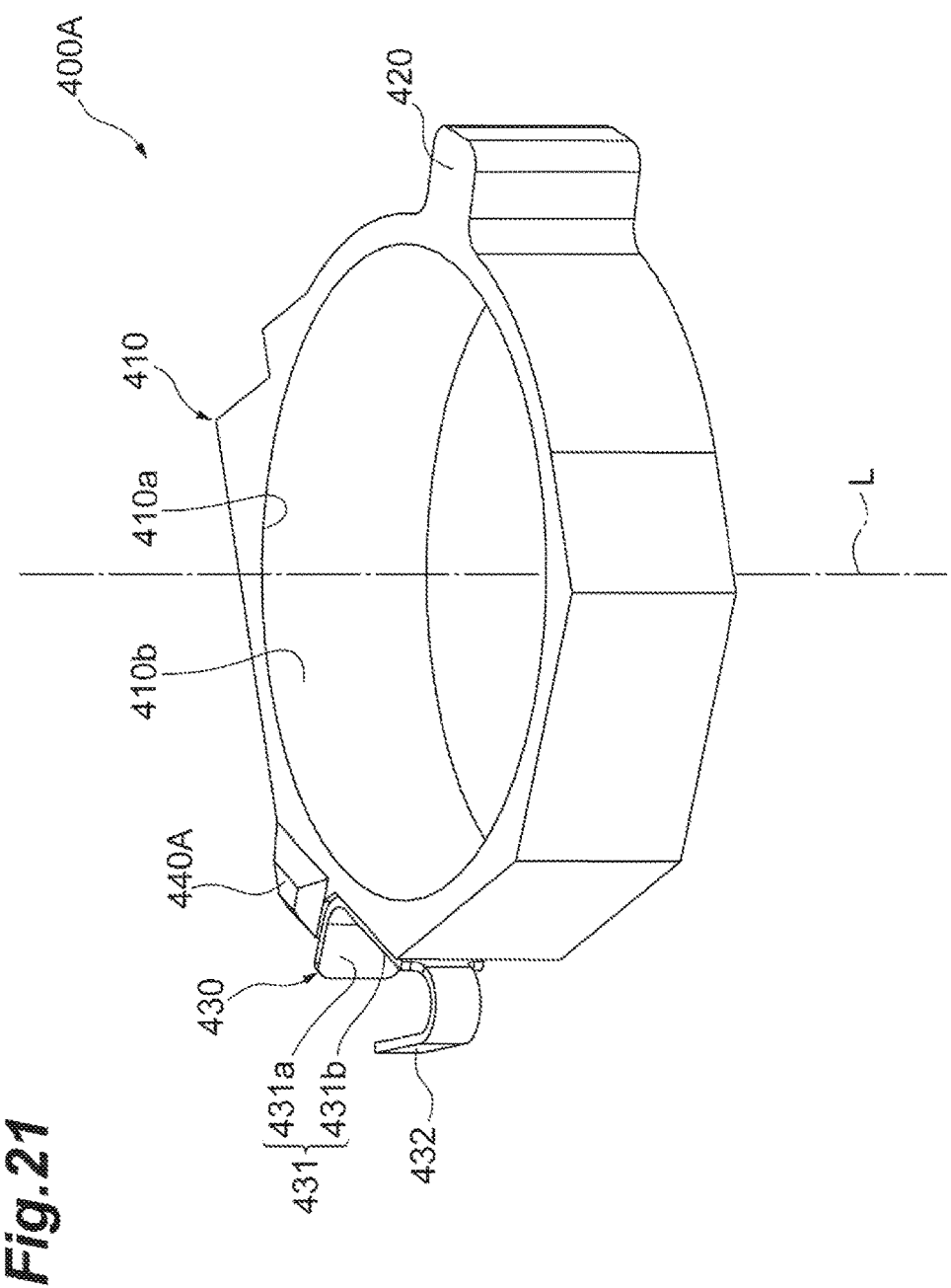
FIG. 21 is a perspective view illustrating a lens carrier according to a modification.
Figure 22:
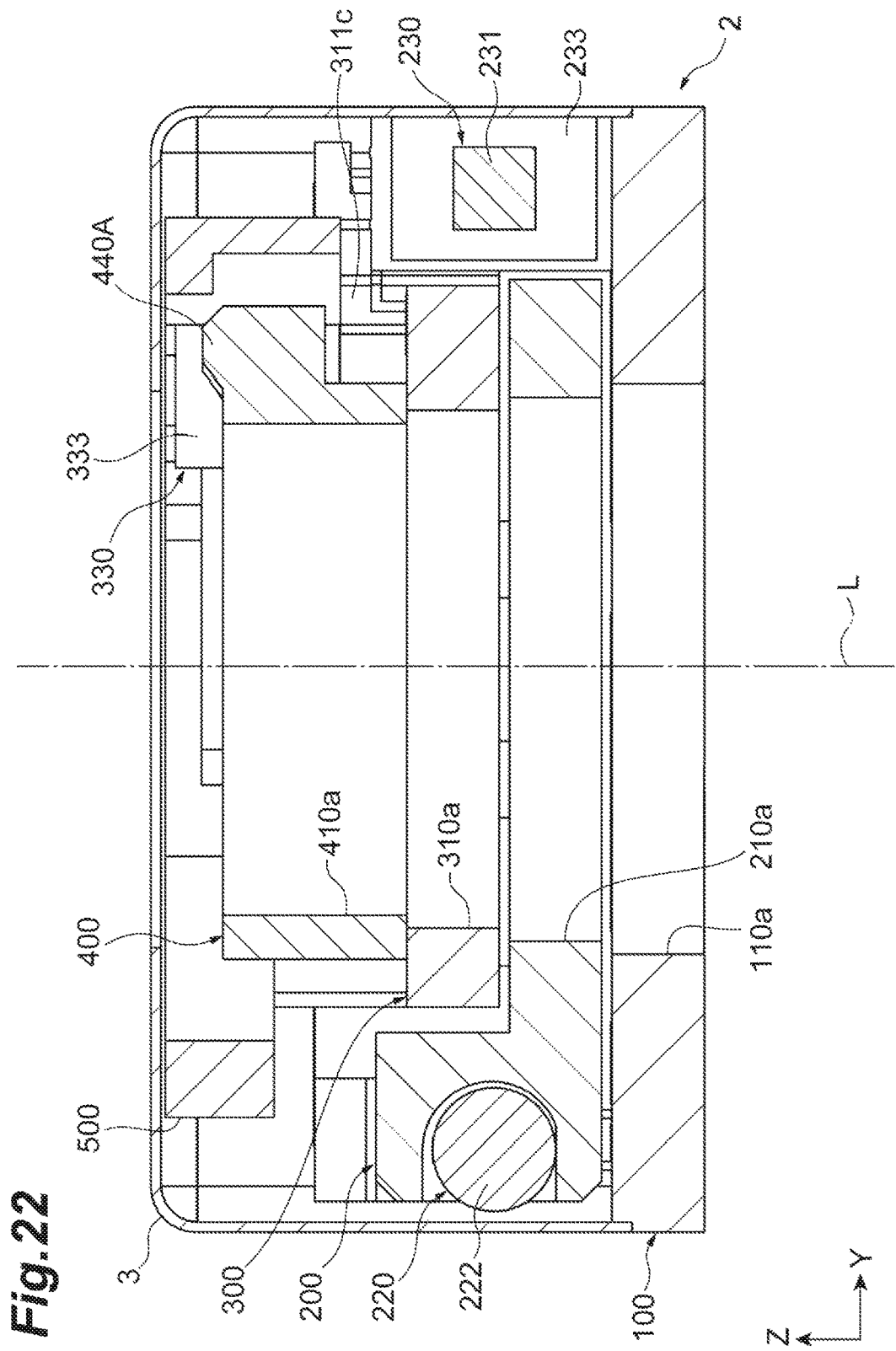
FIG. 22 is a cross-sectional view illustrating a surrounding portion of a carrier convex portion of a lens drive unit according to the modification.

Next, a modification of the carrier stopper mechanism for restricting the movement of the lens carrier in the direction of the optical axis L will be described. In the description of the modification, the same components as the components of the lens drive unit 2 according to the embodiment are denoted with the same reference numerals and the detailed description thereof is omitted. In this modification, the configuration of the lens carrier 400 according to the embodiment is changed. As illustrated in FIGS. 21 and 22, a lens carrier 400A according to this modification includes the carrier body portion 410, the locking convex portion 420, the engagement portion 430, and a carrier convex portion 440A.

The carrier convex portion 440A protrudes from an end face of the carrier body portion 410 at the side covered with the cover 3 along the direction of the optical axis L. A top portion of the carrier convex portion 440A and an inner surface of the cover 3 face each other. The carrier convex portion 440A is provided in the corner portion K3 of the auxiliary member 500, similar to the carrier convex portion 440 according to the embodiment.

The top portion of the carrier convex portion 440A and the inner surface of the cover 3 face each other. As a result, when the lens carrier 400A moves to a position separated by a predetermined distance in the direction of the optical axis L with respect to the Y-axis movable object 300, the top portion of the carrier convex portion 440A and the inner surface of the cover 3 come into contact with each other and the movement of the lens carrier 400A in the direction of the optical axis L is restricted. As such, the carrier convex portion 440A to come into contact with the cover 3 is provided in the lens carrier 400A and the carrier convex portion 440A configured to function as the carrier stopper is intentionally caused to come into contact with the inner surface of the cover 3, so that the movement of the lens carrier 400A in the direction of the optical axis L can be restricted.

The embodiment of the present disclosure has been described. However, the present disclosure is not limited to the embodiment. For example, the X-axis movable object holding portion 120 may not be provided integrally with the base body portion 110 and may be separately provided. Likewise, the Y-axis movable object holding portion 220 may not be provided integrally with the X-axis movable object body portion 210 and may be separately provided. In addition, the hall sensors HS1 to HS3 are used as the position sensors to detect the position of the X-axis movable object 200 or the like. However, position sensors other than the hall sensors may be used.

In addition, the auxiliary member 500 may come into contact with the outer circumferential surface of the Z-axis drive shaft 332 of the carrier actuator 330 at one point and may support the carrier actuator 330. The carrier side contact portion 441 of the carrier convex portion 440 and the auxiliary member side contact portion 521 of the stepped portion 520 provided in the auxiliary member 500 are configured to function as the carrier stopper mechanism. However, the carrier stopper mechanism may be configured using other method. The carrier stopper mechanism (the carrier side contact portion 441 and the auxiliary member side contact portion 521) may be provided in a corner portion other than the corner portion of the auxiliary member 500 in which the carrier actuator 330 is disposed.

What is claimed is:

1. A lens drive device for driving a lens, comprising:
   a base member;
   an X-axis actuator configured to be provided in the base member and have an X-axis piezoelectric element expanding and contracting in an X-axis direction orthogonal to a direction of an optical axis of the lens and an X-axis drive shaft fixed on one end portion of the X-axis direction in the X-axis piezoelectric element;
   an X-axis movable object configured to be disposed to overlap the base member in the direction of the optical axis of the lens and have an X-axis friction engagement portion frictionally engaging with outer circumference of the X-axis drive shaft;
   an X-axis movable object holding portion configured to be provided at a position facing the X-axis actuator with the optical axis of the lens between the X-axis movable object holding portion and the X-axis actuator in the base member and hold the X-axis movable object to be movable in the X-axis direction with respect to the base member;
   a Y-axis actuator configured to be provided in the X-axis movable object and have a Y-axis piezoelectric element expanding and contracting in a Y-axis direction orthogonal to the direction of the optical axis of the lens and crossing the X-axis direction and a Y-axis drive shaft fixed on one end portion of the Y-axis direction in the Y-axis piezoelectric element;

a Y-axis movable object configured to be disposed to overlap the X-axis movable object at the side opposite to the side provided with the base member in the direction of the optical axis of the lens and have a Y-axis friction engagement portion frictionally engaging with outer circumference of the Y-axis drive shaft;

a Y-axis movable object holding portion configured to be provided at a position facing the Y-axis actuator with the optical axis of the lens between the Y-axis movable object holding portion and the Y-axis actuator in the X-axis movable object and hold the Y-axis movable object to be movable in the Y-axis direction with respect to the X-axis movable object;

a carrier actuator configured to be provided in the Y-axis movable object and have a Z-axis piezoelectric element expanding and contracting in the direction of the optical axis of the lens and a Z-axis drive shaft fixed on one end portion of the direction of the optical axis in the Z-axis piezoelectric element;

a lens carrier configured to be disposed to overlap the Y-axis movable object at the side opposite to the side provided with the X-axis movable object in the direction of the optical axis of the lens and have a Z-axis friction engagement portion frictionally engaging with outer circumference of the Z-axis drive shaft and a lens attachment portion to attach the lens;

an auxiliary member configured to be attached to the Y-axis movable object and support the carrier actuator; and a carrier stopper mechanism configured to restrict a movement of the lens carrier in the direction of the optical axis of the lens.

2. The lens drive device according to claim 1, wherein the auxiliary member comes in contact with an outer circumferential surface of the Z-axis drive shaft at two points or more and supports the carrier actuator.

3. The lens drive device according to claim 1, wherein the carrier stopper mechanism is configured using a carrier side contact portion provided in the lens carrier and coming into contact with the auxiliary member when the lens carrier moves to a position separated by a predetermined distance in the direction of the optical axis of the lens with respect to the Y-axis movable object and an auxiliary member side contact portion provided in the auxiliary member and coming into contact with the carrier side contact portion when the lens carrier moves to the position separated by the predetermined distance in the direction of the optical axis of the lens with respect to the Y-axis movable object.

4. The lens drive device according to claim 3, wherein the lens carrier further has a carrier body portion provided with the Z-axis friction engagement portion and the lens attachment portion and a carrier convex portion provided on an outer circumferential surface of the carrier body portion and protruding in a direction orthogonal to the direction of the optical axis of the lens, the carrier side contact portion is configured using a surface of the carrier convex portion at the side opposite to the side of the Y-axis movable object, and the auxiliary member side contact portion is configured using a surface of the auxiliary member at the side of the Y-axis movable object.

5. The lens drive device according to claim 1, wherein the auxiliary member has an approximately rectangular frame shape surrounding the lens carrier, when viewed from the direction of the optical axis of the lens, the carrier actuator is disposed in a corner portion of the auxiliary member in a frame of the auxiliary member, and the carrier stopper mechanism is provided in the corner portion in which the carrier actuator is disposed, among corner portions of the auxiliary member.

* * * * *